(12) United States Patent
Floch et al.

(10) Patent No.: US 10,396,889 B2
(45) Date of Patent: Aug. 27, 2019

(54) WIRELESS COMMUNICATION UNIT, INTEGRATED CIRCUIT, SATELLITE COMMUNICATION SYSTEM AND METHOD FOR COMPENSATING FOR IONOSPHERIC GROUP DELAY

(71) Applicant: Airbus DS GmbH, Taufkirchen (DE)

(72) Inventors: Jean-Jacques Floch, Munich (DE); Francis Soualle, Munich (DE); Jan Wendel, Munich (DE)

(73) Assignee: AIRBUS DS GMBH, Taufkirchen (DE)

( * ) Notice: Subject to any disclaimer, the term of this patent is extended or adjusted under 35 U.S.C. 154(b) by 64 days.

(21) Appl. No.: 15/253,332

(22) Filed: Aug. 31, 2016

(65) Prior Publication Data

US 2017/0070283 A1   Mar. 9, 2017

(30) Foreign Application Priority Data

Sep. 4, 2015  (EP) ..................................... 15002605
Feb. 15, 2016  (EP) ..................................... 16000368

(51) Int. Cl.
*H04W 4/00*     (2018.01)
*H04B 7/185*    (2006.01)
(Continued)

(52) U.S. Cl.
CPC .......... *H04B 7/18532* (2013.01); *G01S 19/07* (2013.01); *H04B 7/185* (2013.01);
(Continued)

(58) Field of Classification Search
CPC ..... H04L 7/0054; H04L 7/0016; H04B 7/185; H04B 7/18508; H04B 7/18532;
(Continued)

(56) References Cited

U.S. PATENT DOCUMENTS 5,323,322 A * 6/1994 Mueller ................ G01S 5/0009
                                                        342/357.27
6,040,798 A    3/2000 Kinal et al.
(Continued)

FOREIGN PATENT DOCUMENTS

AU           733187       5/2001
KR        20020045403     6/2002
(Continued)

OTHER PUBLICATIONS

Kaspar, Multi-Signal Tracking in GNSS, Dissertation, Technical University of Munich, 314 pages, May 2014.*
(Continued)

*Primary Examiner* — Frank Duong
(74) *Attorney, Agent, or Firm* — Greer, Burns & Crain, Ltd.

(57) ABSTRACT

A wireless communication unit for compensating for Ionospheric group delay in a satellite communication system. The wireless communication unit comprises: a receiver configured to receive a multi-carrier signal from a satellite; and a processor coupled to the receiver. The processor is configured to: process the multi-carrier signal to produce a plurality of digital representations of individual carriers of the multi-carrier signal; estimate, from the plurality of digital representations of individual carriers of the multi-carrier signal, a Total Electron Content, TEC, value associated with a communication path between the satellite and the wireless communication unit through Earth's Ionosphere; and apply compensation for Ionospheric group delay subjected to the multi-carrier signal based on the determined TEC value.

10 Claims, 11 Drawing Sheets

(51) Int. Cl.
*G01S 19/07* (2010.01)
*H04L 7/00* (2006.01)

(52) U.S. Cl.
CPC ....... *H04B 7/18508* (2013.01); *H04L 7/0016* (2013.01); *H04L 7/0054* (2013.01)

(58) Field of Classification Search
CPC .......... G01S 19/07; G01S 19/22; G01S 19/32; G01S 19/37
See application file for complete search history.

(56) References Cited

U.S. PATENT DOCUMENTS

| | | | |
|---|---|---|---|
| 6,163,295 A * | 12/2000 | Nagasamy | G01S 19/40 342/357.59 |
| 7,375,680 B2 * | 5/2008 | Watson | G01S 19/32 342/357.23 |
| 2005/0117669 A1 | 6/2005 | Walker et al. | |
| 2006/0273953 A1 | 12/2006 | Watson et al. | |
| 2008/0069187 A1 * | 3/2008 | Chen | G01S 19/30 375/148 |
| 2015/0236751 A1 * | 8/2015 | Floch | H04B 1/713 375/136 |

FOREIGN PATENT DOCUMENTS

| | | |
|---|---|---|
| WO | 2005055444 | 6/2005 |
| WO | 2006124110 | 11/2006 |

OTHER PUBLICATIONS

Jan, Vertical Guidance Performance Analysis of the L1-L5 Dual-Frequency GPS/WAAS User Avionics Sensor, Sensors, 17 pages, 2010.*

Wang, Performance Evaluation of GPS L1/L2 Positioning with Partial Availability of the L2C Signals, Thesis, University of Calgary, 156 pages, 2010.*

Stankov et al, Ionospheric effects on GNSS reference network integrity, Elsevier, 15 pages, 2007.*

Klobuchar, Ionospheric Time-Delay Algorithm for Single-Frequency GPS Users, IEEE, 9 pages, 1987.*

German Search Report, dated Jan. 25, 2017, priority document.

"Compliance of Single Frequency Ionospheric Delay Estimation and Cycle Slip Detection with Civil Aviation Requirements" Christophe Ouzeau.

* cited by examiner

WIRELESS COMMUNICATION UNIT, INTEGRATED CIRCUIT, SATELLITE COMMUNICATION SYSTEM AND METHOD FOR COMPENSATING FOR IONOSPHERIC GROUP DELAY

CROSS-REFERENCES TO RELATED APPLICATIONS

This application claims the benefit of the European patent application No. 15 002 605.2 filed on Sep. 4, 2015, and of the European patent application No. 16 000 368.7 filed on Feb. 15, 2016, the entire disclosures of which are incorporated herein by way of reference.

TECHNICAL FIELD

The field of this invention relates generally to a wireless communication unit operating in a satellite communication system. In particular, the field of this invention relates to a wireless communication unit, integrated circuit and a method to compensate for Ionospheric group delay in a satellite communication system.

BACKGROUND OF THE INVENTION

In satellite communication systems, the largest single source of positioning error to single frequency Global Positioning System (GPS) receivers is due to the unknown and large incurred time delay of the GPS signal as it propagates through the Earth's ionosphere. The ionosphere acts as a dispersive medium for radio signals. This delay is often referred to as Ionospheric group delay.

The Ionospheric group delay is defined by:

$$\tau(f)[m] = \frac{40.3 \cdot TEC[1/m^2]}{(f[Hz])^2} \quad \text{Equation [1]}$$

where: f is the center frequency of the signal, and typical values are 1-100 TEC units (TECU), with 1 TECU=1016 electrons/m2.

There are two known methods to compensate for Ionospheric group delay. A first known method requires specialized infrastructure in the form of a network of 'dual-frequency' receivers located over the area of interest. In such a dual-frequency approach, a known method to compensate for distortion due to Ionospheric group delay is to transmit signals on the two frequency carriers, with one frequency carrier carrying an additional information signal that is dedicated to compensate for Ionospheric group delay.

A Total Electron Content (TEC) value can then be derived from a correct reception of the two signals on the two distinct carrier frequencies. For instance the frequency separation between L1 and L2 GPS signal is around 350 MHz. Ionospheric TEC is characterized by observing carrier phase delays of received radio signals transmitted from satellites located above the ionosphere, often using Global Positioning System (GPS) satellites. TEC is an important descriptive quantity for the ionosphere of the Earth and is strongly affected by solar activity. A definition of TEC is the total number of electrons integrated between two points, along a tube of one meter squared cross-section, i.e., the electron columnar number density.

TEC is significant in determining the scintillation and group and phase delays of radio waves passing through a medium. By making measurements simultaneously on signals transmitted by a satellite on two distinct frequencies, most of the detrimental effects of the ionosphere on the radio signal can be removed. By knowing the TEC, the phase dispersion can be derived. The phase dispersion may be expressed by:

$$\varphi(f)[rad] = -2 \cdot \pi \cdot \frac{40.3 \cdot 10^{16} \cdot TEC[TECU]}{c_0[m/s] \cdot f[Hz]} \quad \text{Equation [2]}$$

Where: C0 is vacuum speed of light.

There are a number of potential problems with such a dual frequency approach. For example, the additional information may not be available in some parts of the world, for instance during major conflicts. Furthermore, a presence of the second frequency channel also increases susceptibility to disturbance by a presence of high interference or jamming devices.

However, single-frequency devices, such as most vehicle navigation and handheld receivers, don't offer the opportunity of dual-frequency correction. These single-frequency devices must rely on a single-frequency, real-time, mapping correction model. Thus, a second known method to compensate for Ionospheric group delay is to use a model that represents the expected Ionospheric group delay, for example the Klobuchar (1987) model or the International Reference Ionosphere (IRI) model (Bilitza 2001). The Klobuchar method is based on an empirical approach. To use this method, the user needs to receive a Klobuchar ionospheric model broadcast by the transmitter on navigation satellite signals, which models the ionosphere delay as a function of the user position. Consequently, this second method is known to be complex to implement.

The coefficients for such a model are included in the navigation messages transmitted by all GPS satellites. Known as the Ionospheric Correction Algorithm or Klobuchar Algorithm, it removes at least 50 percent of the ionosphere's effect on radio signals passing there through. Such real-time mapping information is typically sent on a per-region basis via a geostationary satellite broadcasting on GPS frequencies. Known real-time mapping techniques are employed in the Wide Area Augmentation System (WAAS) available in North America, the European Geostationary Navigation Overlay System (EGNOS) available in Europe, and the Multi-functional Satellite Augmentation System (MSAS) available in Asia. Also, any extension of EGNOS to North Africa or the Middle East may well increase the impact of ionosphere on the new area, as the TEC value is higher when closer to the Equator.

SUMMARY OF THE INVENTION

The present invention provides communication units and methods of operation at such communication units in a satellite communication system that facilitate compensating for Ionospheric group delay, as described in the accompanying claims. Specific embodiments of the invention are set forth in the dependent claims. These and other aspects of the invention will be apparent from and elucidated with reference to the embodiments described hereinafter In a first aspect of the invention, a wireless communication unit is described for compensating for Ionospheric group delay in a satellite communication system. The wireless communication unit comprises: a receiver configured to receive a multi-carrier signal from a satellite; and a processor coupled to the receiver and configured to: process the multi-carrier signal to produce a plurality of digital representations of individual carriers of the multi-carrier signal; estimate, from the plurality of digital representations of individual carriers of the multi-carrier signal, a Total Electron Content, TEC, value associated with a communication path between the satellite and the wireless communication unit through Earth's Ionosphere; and apply compensation for Ionospheric group delay subjected to the multi-carrier signal based on the determined TEC value.

In one example, the processor may be further configured to calculate Ionospheric group delay subjected to the multi-carrier signal based on the estimated TEC value.

In one example, the processor is configured to apply compensation for Ionospheric group delay to at least one from a group of: a code oscillator output coupled to the processor, a carrier oscillator output coupled to the processor In one example, the processor is configured to estimate the TEC value for a plurality of carrier combination of the multi-carrier signal and perform an average of the TEC value across the plurality of carrier combinations to estimate the TEC value.

In one example, the processor is configured to estimate the TEC value for each carrier combination of the multi-carrier signal during a signal tracking operation when the carriers of the multi-carrier signal transport traffic messages.

In one example, the processor being configured to process the multi-carrier signal to produce a plurality of digital representations of individual carriers of the multi-carrier signal comprises the processor being configured to perform a partial correlation of the multi-carrier signal to determine punctual phases of the plurality of carrier signals of the multi-carrier signal.

In one example, the processor is further configured to detect a cycle slip for each of the plurality of the carrier signals of the multi-carrier signal and provide a cycle slip correction of the respective punctual phases of the plurality of carrier signals of the multi-carrier signal.

In one example, the processor is further configured to perform a frequency (a) discriminator estimation of each of the cycle slip corrections of the respective punctual phases and average a plurality of discriminator estimation combinations for the carrier signals to produce a TEC estimate value.

In one example, the processor comprises an adaptive linear filter, such as a Kalman filter configured to identify carrier signals in the multi-carrier signal. A Kalman filter, also known as linear quadratic estimation (LQE), is an algorithm run by a processor that uses a series of measurements observed over time, containing statistical noise and other inaccuracies, and produces estimates of unknown variables that tend to be more precise than those that may be based on a single measurement alone. In this manner, acquisition and loss of each satellite may be taken into account in an estimation algorithm by updating the Kalman filter states according to the different satellites in view.

In one example, the receiver is a single frequency tracking receiver configured to recover traffic messages from a plurality of carriers of the multi-carrier signal.

In a second aspect of the invention, an integrated circuit for a wireless communication unit for communicating with a satellite in a satellite-based communication system is described. The integrated circuit comprises: a processor coupleable to a receiver and configured to: process the multi-carrier signal to produce a plurality of digital representations of individual carriers of the multi-carrier signal; estimate, from the plurality of digital representations of individual carriers of the multi-carrier signal, a Total Electron Content, TEC, value associated with a communication path between the satellite and the wireless communication unit through Earth's Ionosphere; and apply compensation for Ionospheric group delay subjected to the multi-carrier signal based on the determined TEC value.

In a third aspect of the invention, a method for compensating for Ionospheric group delay in a satellite-based communication system is described. The method at a wireless communication unit comprises: receiving a multi-carrier signal from a satellite; and processing the multi-carrier signal to produce a plurality of digital representations of individual carriers of the multi-carrier signal; estimating, from the plurality of digital representations of individual carriers of the multi-carrier signal, a Total Electron Content, TEC, value associated with a communication path between the satellite and the wireless communication unit through Earth's Ionosphere; and applying compensation for Ionospheric group delay subjected to the multi-carrier signal based on the determined TEC value.

In a fourth aspect of the invention, a satellite communication system comprises: a transmit wireless communication unit configured to generate a signal to be broadcast in a satellite communication system and enable a receiver to compensate for Ionospheric group delay subjected on the signal; and a receive wireless communication unit. The receive wireless communication unit comprises: a receiver configured to receive a multi-carrier signal from a satellite; and a processor coupled to the receiver and configured to: process the multi-carrier signal to produce a plurality of digital representations of individual carriers of the multi-carrier signal; estimate, from the plurality of digital representations of individual carriers of the multi-carrier signal, a Total Electron Content, TEC, value associated with a communication path between the satellite and the wireless communication unit through Earth's Ionosphere; and apply compensation for Ionospheric group delay subjected to the multi-carrier signal based on the determined TEC value.

In a fifth aspect of the invention, a wireless communication unit for generating a signal to be broadcast in a satellite communication system is described, The signal is generated in such a manner to enable a receiver to compensate for Ionospheric group delay subjected on the signal. The wireless communication unit comprises: a transmitter; a processor coupled to the transmitter and configured to: receive data to be transmitted; generate a multi-carrier signal, where the carrier signal separation of carriers in the multi-carrier signal is equivalent to less than one cycle slip; apply the data to be transmitted to the multi-carrier signal; and transmit the multi-carrier signal to one or more receiver communication units via a satellite.

In some optional examples, the data to be transmitted may then be applied to the multi-carrier signal and the multi-carrier signal transmitted to one or more receiver communication units via a satellite asynchronously. In this manner, in one example, multi-carrier signals may be transmitted over a narrow bandwidth in, say, a frequency hopping manner.

In some optional examples, the data to be transmitted may then be applied to the multi-carrier signal such that multiple carriers of the multi-carrier signal may be transmitted simultaneously to one or more receiver communication units via a satellite, for example in an OFDM manner.

A further aspect of the invention may include a method for generating a signal to be broadcast in a satellite communication system and enable a receiver to compensate for Ionospheric group delay subjected on the signal. The method, which may be implemented by a non-transitory tangible computer program product comprising executable code stored therein, may be operable for, when executed at a transmitting wireless communication unit, receiving data to be transmitted; generating a multi-carrier signal, where the separation between carriers in the multi-carrier signal is equivalent to less than one cycle slip; applying the data to be transmitted to the multi-carrier signal; and transmitting the multi-carrier signal to one or more receiver communication units via a satellite.

A further aspect of the invention may include a method for compensating for Ionospheric group delay in a satellite-based communication system. The method, which may be implemented by a non-transitory tangible computer program product comprising executable code stored therein, may be operable for, when executed at a receiving wireless communication unit, receiving a multi-carrier signal from a satellite; and processing the multi-carrier signal to produce a plurality of digital representations of individual carriers of the multi-carrier signal; estimating, from the plurality of digital representations of individual carriers of the multi-carrier signal, a Total Electron Content, TEC, value associated with a communication path between the satellite and the wireless communication unit through Earth's Ionosphere; and applying compensation for Ionospheric group delay subjected to the multi-carrier signal based on the determined TEC value.

A further aspect of the invention may include an integrated circuit for a wireless communication unit for generating a signal to be broadcast in a satellite communication system. The signal is generated in such a manner to enable a receiver to compensate for Ionospheric group delay subjected on the signal. The integrated circuit comprises: a processor coupled to a transmitter and configured to: receive data to be transmitted; generate a multi-carrier signal, where the carrier signal separation of carriers in the multi-carrier signal is equivalent to less than one cycle slip; apply the data to be transmitted to the multi-carrier signal; and transmit the multi-carrier signal to one or more receiver communication units via a satellite.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

Figure 1:
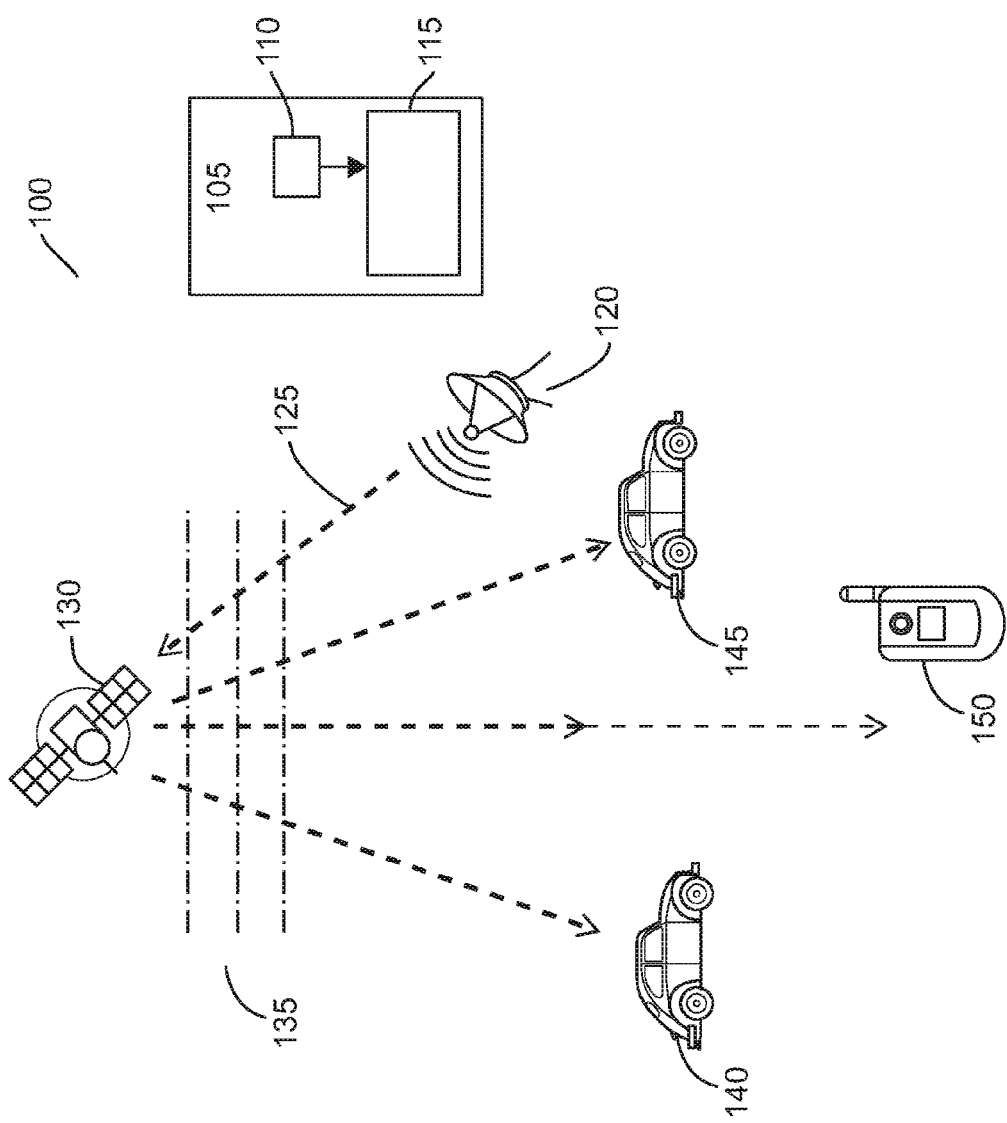
FIG. 1 illustrates an overview of a satellite communication system adapted to support a single frequency multi-carrier signal configured to enable a TEC value to be determined based solely on messages contained in the single frequency multi-carrier signal.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment, such as memory, are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE PREFERRED EMBODIMENTS

It is known that the ionosphere generates a delay in code measurements as well as an advance in carrier phase for signals having the same signal amplitude. Thus, the inventors have recognized and appreciated that it is possible to determine a difference between the two measurements at the same frequency. Thereafter, the inventors have recognized and appreciated that it is possible to consequently estimate Ionospheric group delay using this difference, instead of using 'ionospheric-free' pseudo-range measurements as in the known dual-frequency technique. If we consider, for simplification, that the phase of the TEC transfer function is linear, for example as a first-order Taylor series, the inventors recognized and appreciated that, in theory, it may be possible to evaluate the TEC with two frequencies, as found in a Binary Offset Carrier (BOC) signal.

However, the inventors also recognized and appreciated that if the two frequencies were separated by more than a cycle slip, it would be very difficult to distinguish between this phase difference or whether the phase difference may be due to additional cycle slips (caused by say noise, multipath, dynamic effects, etc.). As such, examples of the invention propose using a multi-carrier signal transmission approach, in order to facilitate the two measurements at the same frequency.

Example embodiments of the invention employ a single multi-carrier signal with characteristics of the signal itself to be used to evaluate the TEC. In particular, example embodiments of the invention modify the classical receiver architecture to include new circuitry and/or processing functionality that evaluates the TEC during tracking of the multi-carrier signal. In particular, during tracking, some examples propose that the receiver includes a processor configured to perform a phase evaluation. In one example, a correlator such as a cross-correlator function (CCF) may be used to evaluate a signal that is below the noise. Here, the processor determines a cross-correlator function (CCF) of punctual phases of a plurality of carriers within the multi-carrier signal to evaluate accurately a TEC value. In other examples single or multi-correlators may be used. In one example, where each carrier of the multi-carrier is above the noise, a phase comparator or a phase detector may be used to evaluate a signal above the noise, for example by combining a received signal and a locally generated reference to produce an output voltage proportional to the phase difference. Thus, the processor may function as a phase evaluator to perform one or more of the above.

Once the TEC value has been evaluated accurately, the Ionospheric group delay can be calculated and compensated for. In one example a TEC iteration search can also be applied for each of the carriers, verifying that after applying compensation of the Ionosphere group delay value the phase of all carriers are synchronized.

In some examples, the plurality of carriers within the multi-carrier signal used to determine the CCF punctual phase may be a majority of the available carriers. In some examples, the plurality of carriers within the multi-carrier signal used to determine the CCF punctual phase may be all of the available carriers. One benefit from evaluating the TEC more accurately during tracking is to have a single frequency user (e.g., an E1 user or device) receiving a single frequency signal that is impacted less by passing through the ionosphere.

Advantageously, the multi-carrier signal transmits real data, solely from which the TEC is evaluated. One advantage of transmitting and receiving a multi-carrier signal, with carrier close to each other, is that the receiver is able to detect cycle slips over frequency and over time. In this manner, the use of multi-frequency makes the evaluation of the TEC more accurate, thereby limiting or eliminating any error contributor due to, say, noise or multipath. Furthermore, there is no requirement to broadcast any other information, for example any additional signal(s) that would be used solely to compensate for Ionospheric group delay, as in a dual-carrier frequency approach. Furthermore, and advantageously, there is no requirement with a single frequency carrier implementation to also transmit a GPS-based or Galileo-based user model, in order to facilitate Ionospheric group delay compensation.

It is known that carrier phase measurements may be subject to cycle slips that would result in a variation of the phase ambiguity, and so provide an additive error on the Ionospheric group delay estimation. If a cycle slip occurs, phase measurements are biased and consequently estimations must be corrected so as to provide a good estimation of Ionospheric code delay. Consequently, in some examples of the invention, cycle slips in carrier phase measurements may be monitored, in order to comply with civil aviation requirements to ensure integrity of the system.

Example embodiments therefore facilitate real-time estimating of Ionospheric group delay due to ambiguities for each satellite in view. A first example approach is to identify cycle slip detection and thereafter perform a TEC evaluation following a method to separate the carrier frequencies of the multi-carrier signal. As a first approximation, with this method, the non-linearity may be neglected. A second example approach is to identify cycle slip detection and thereafter perform a TEC evaluation through, say, a Kalman filter. Remaining cycle slips may be detected by the Kalman filter.

The method according to example embodiments is applied by transmitting and receiving multi-carrier signals, with or without employing time division multiplexing techniques. The TEC can be evaluated by applying the ionospheric phase dispersion calculation of Equation [3] below:

$$\varphi_i = \underbrace{\frac{-2\pi \times 10^{16} \times 40.3}{c_0}}_{A} TEC\left[\frac{1}{f_{carrier} + \Delta f_i}\right] + \delta\varphi \qquad \text{Equation [3]}$$

With $\delta\varphi$: the carrier phase tracking (distance between the transmitter and receiver)

$\Delta f_i$ the frequency shift between the frequency carrier fcarrier and the carrier i of the multi carrier signal Thus, the TEC value may be defined as:

$$TEC = \frac{\Delta\varphi(\Delta f_i - \Delta f_j)}{A \cdot \left(\frac{1}{f_{carrier} + \Delta f_i} - \frac{1}{f_{carrier} + \Delta f_j}\right)} \qquad \text{Equation [4]}$$

One advantage of using a multi-carrier signal for the TEC evaluation is that carrier slip can be detected easily by supposing that between two consecutive carriers, no cycle slip can occur, even if the TEC is very high. Therefore, it is important to consider a maximum number of correlators with low carrier shift ($\Delta f_i - \Delta f_j$) between two consecutive signal carriers in order to obtain an accurate TEC value. The number of correlators depends on the environment (e.g., noise, multipath, etc.), where a higher number provides a better evaluation. However, in some examples and in principle, two correlators are sufficient to evaluate the TEC (i.e., a slope of the phase).

In order to limit the ionosphere scintillation impact, in examples of the invention, an open loop system is described. In one example, a frequency (a) discriminator is used to evaluate the carrier signals of a multi-carrier signal, in pseudo real-time, based on traffic data and thereafter apply the Ionospheric group delay compensation. In some examples, it is proposed to use a very low bandwidth loop (e.g., of the order of 10 MHz) in order to smooth the effect of the ionosphere scintillation, noise and multipath. In some examples, the determination of carrier signal updates of 'α' may then be provided, say, every 100 seconds. It is considered that such a pseudo real-time update of 'α' may be acceptable, as the change of the TEC estimate is very slow.

FIG. 1 illustrates an overview of a satellite communication system 100 adapted to support a single frequency multi-carrier signal configured to determine a TEC based solely on traffic messages contained in the single frequency multi-carrier signal. The satellite communication system 100 comprises a transmitter unit 105 comprising, inter alia, a processor 110 configured to generate a multi-carrier signal. The processor is coupled to a satellite transmitter circuit 115, in the form of a radio frequency front-end that is arranged to convert the multi-carrier signal to a single radio frequency multi-carrier signal and route the signal to a satellite transmitter 120. The single frequency multi-carrier signal 125 is then sent to a satellite 130 through the Earth's Ionosphere 135, from where it is then broadcast to multiple user devices 140, 145, 150, again through the Earth's Ionosphere 135.

Each of the multiple user devices 140, 145, 150 comprises a receiver and processor arrangement configured to receive and process the broadcast single radio frequency multi-carrier signal 125 in order to compensate for Ionospheric group delay of signals received in the satellite communication system 100.

In some examples, carrier phase ambiguities may be estimated by the multiple user devices 140, 145, 150 before estimating single frequency Ionospheric group delay. As illustrated, a difference between code and carrier phase measurements may include twice the Ionospheric group delay, plus any additional phase ambiguity, residual noise and multipath. To be able to solve the phase ambiguity the code error has to be lower than any cycle slip. In most cases, it is unrealistic to have a code error below the wave length (for example approximately 21 cm for an E1 signal) including clock error contribution. Thus, it is important that the multi-carrier signal 125 is generated with a sufficiently low carrier separation so as not to be adversely affected by cycle slips.

Therefore, processor 110 is configured to receive data to be transmitted; and generate a multi-carrier signal, where the carrier signal separation of carriers in the multi-carrier signal is equivalent to less than one cycle slip. The processor 110 is configured to then apply the data to be transmitted to the multi-carrier signal. A transmitter 115 is coupled to the processor 110 and configured to transmit the multi-carrier signal 125 to one or more receiver communication units via satellite 130.

The various components within the transmitter unit 105 can be realized in discrete or integrated component form, with an ultimate structure therefore being an application-specific or design selection. For example, an integrated circuit may comprise processor 110 being configured to: receive data to be transmitted; generate a multi-carrier signal, where the carrier signal separation of carriers in the multi-carrier signal is equivalent to less than one cycle slip; apply the data to be transmitted to the multi-carrier signal; and transmit the multi-carrier signal to one or more receiver communication units via a satellite.

In some optional examples, the data to be transmitted may be applied to the multi-carrier signal, and the multi-carrier signal 125 transmitted to one or more receiver communication units via a satellite asynchronously. In this manner, in one example, multi-carrier signals 125 may be transmitted over a narrow bandwidth in, say, a frequency hopping manner. In some optional examples, the data to be transmitted may be applied to the multi-carrier signal in a manner such that multiple carriers of the multi-carrier signal 125 may be transmitted simultaneously to one or more receiver communication units via a satellite, for example in an OFDM manner.

Figure 2:
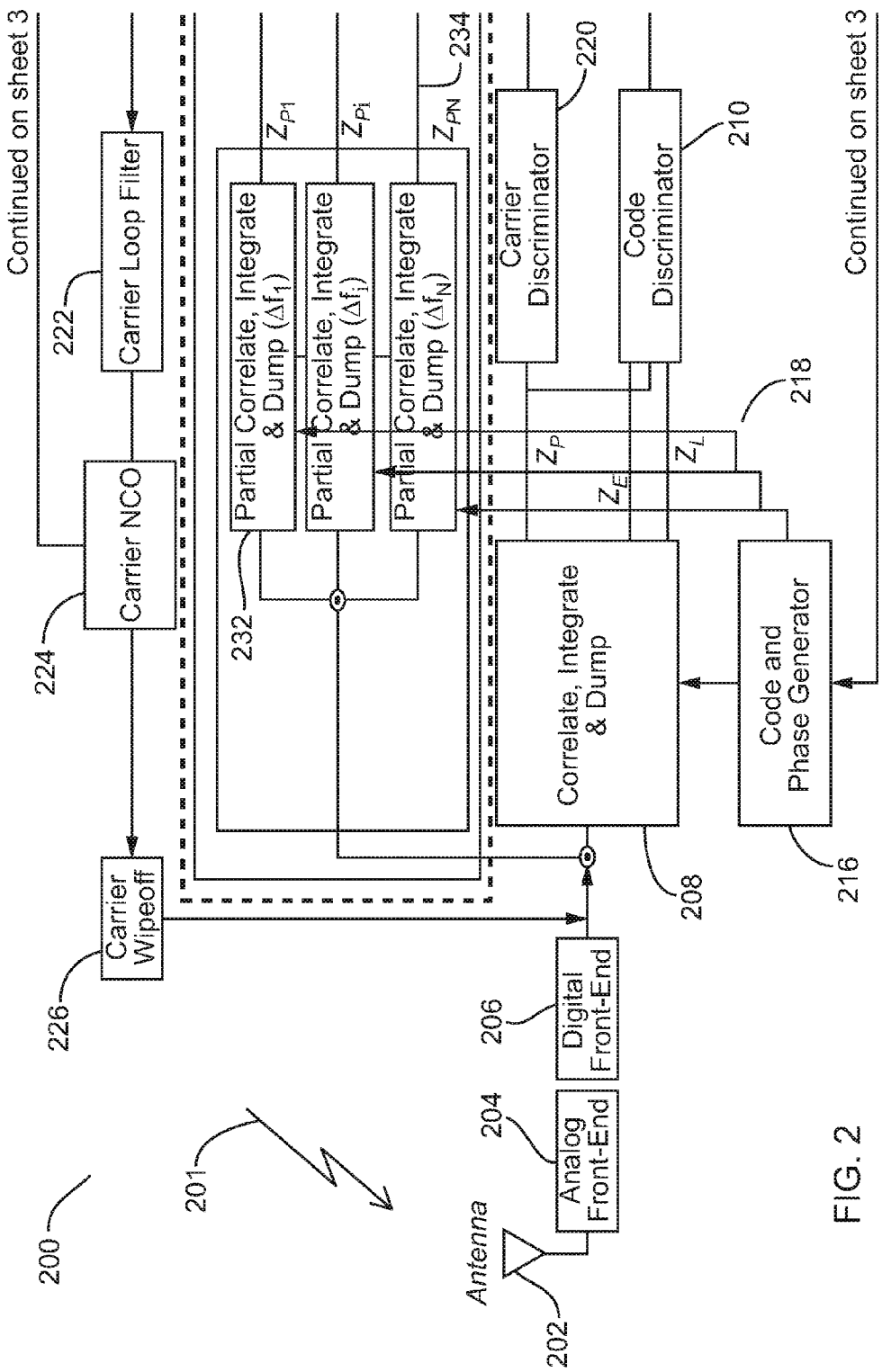
FIG. 2 illustrates a first example of a wireless communication unit for communicating on the satellite communication system of FIG. 1 and adapted in accordance with some example embodiments of the present invention.
Figure 2:
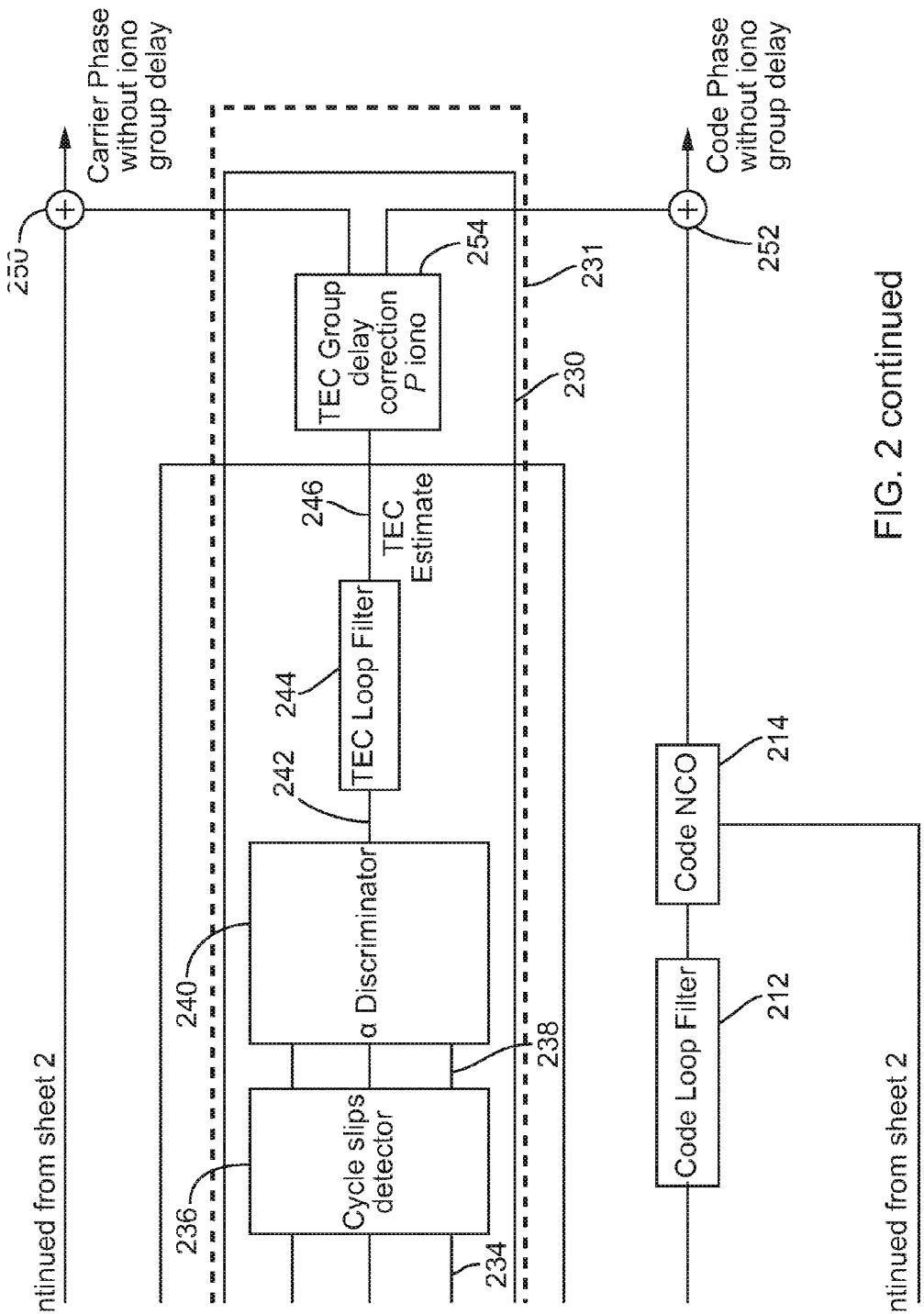
Figure 4:
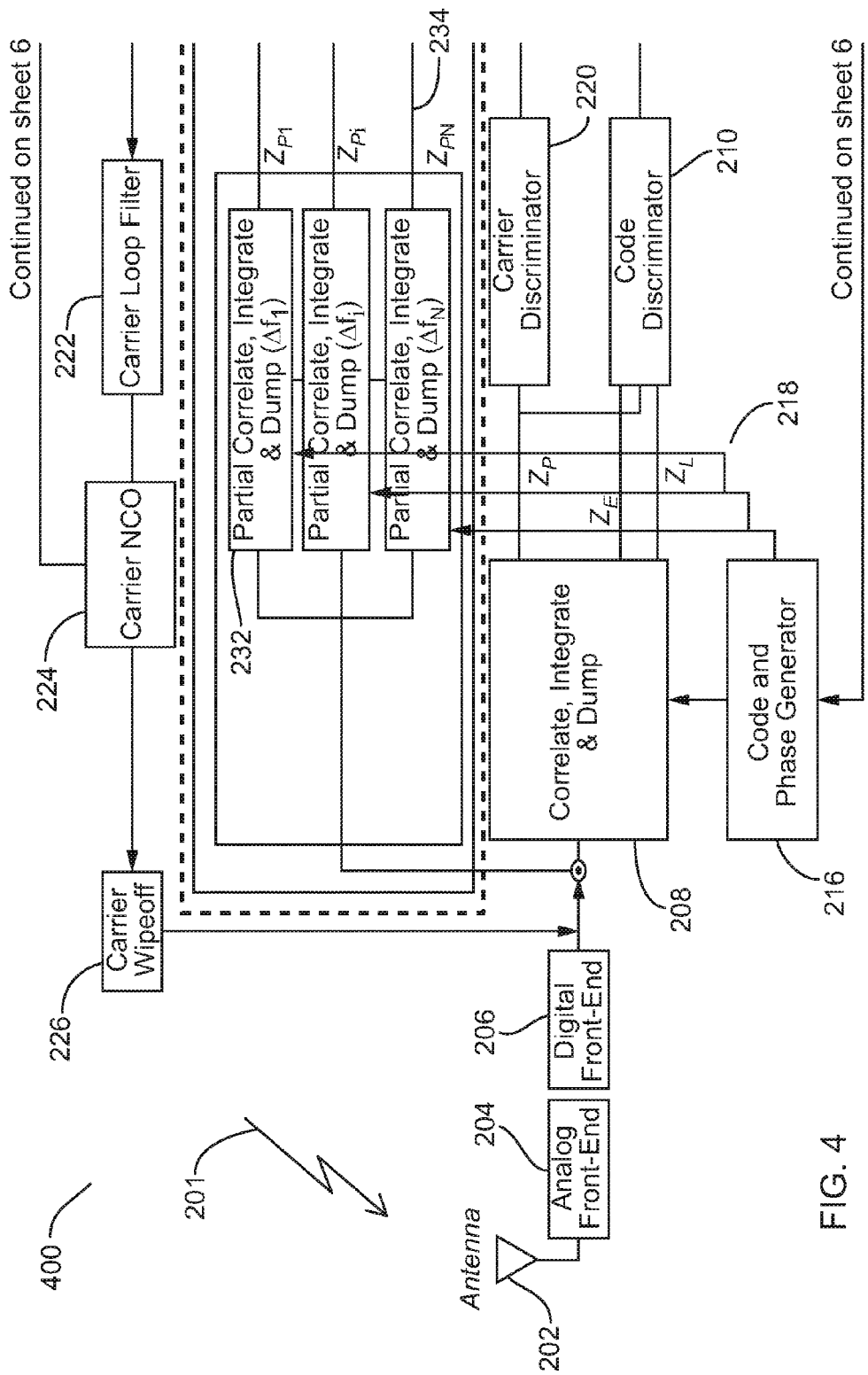
FIG. 4 illustrates a second example of a wireless communication unit for communicating on the satellite communication system of FIG. 1 and adapted in accordance with some example embodiments of the present invention.
Figure 4:
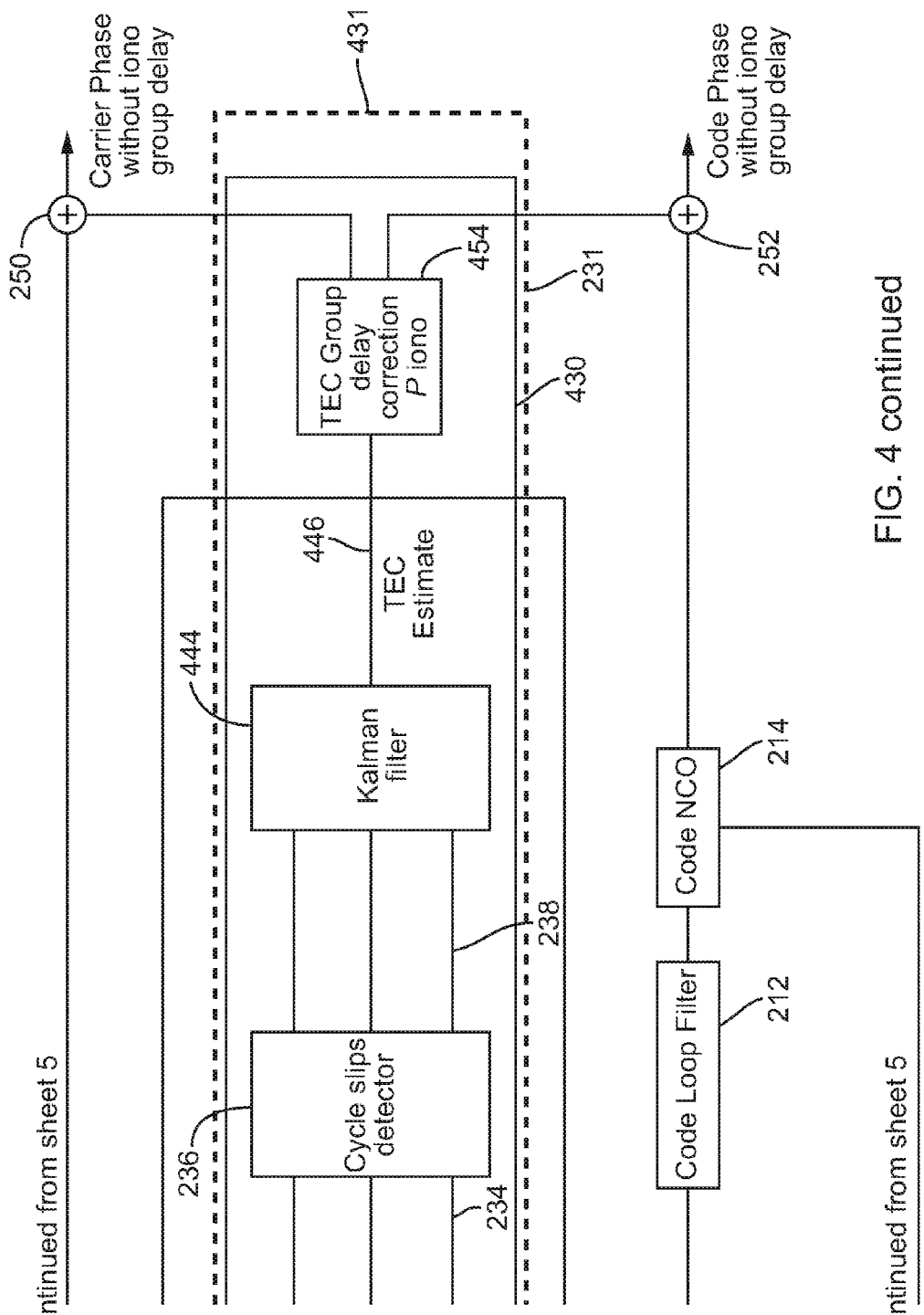

In example receivers of the invention, two different example architectures to evaluate the TEC during tracking are proposed. In a first receiver architecture, as illustrated in FIG. 2, a tracking receiver with a TEC estimator using a frequency discriminator ('α') to identify carrier signals from a multi-carrier signal, within a classical loop, is presented. In a second receiver architecture, as illustrated in FIG. 4, a tracking receiver with TEC estimator using an adaptive linear filter, such as a Kalman filter, is presented.

FIG. 2 illustrates a first example of a wireless communication unit for communicating on the satellite communication system, say satellite communication system 100 from FIG. 1, and adapted in accordance with some example embodiments of the present invention. In practice, purely for the purposes of explaining embodiments of the invention, the wireless communication unit is described in terms of a user equipment (UE) subscriber communication unit. The wireless communication unit 200 contains an antenna 202, for receiving transmissions 201 from a satellite. The antenna 202 is coupled to one or more receiver chains via an antenna switch or duplexer (not shown) that provides isolation between receive and transmit chains within the wireless communication unit 200. One or more receiver chains, as known in the art, include analog front-end circuitry 204 (effectively providing reception, filtering, radio frequency amplification, intermediate or base-band frequency conversion, etc.). The analog front-end circuitry 204 is coupled to a digital front-end circuitry 206 (effectively providing further filtering, amplification, and signal manipulation, etc.). In some examples, the digital front-end circuitry 206 includes one or more signal processors (generally realized by digital signal processor (DSP)). A skilled artisan will appreciate that the level of integration of receiver circuits or components may be, in some instances, implementation-dependent. A skilled artisan will also appreciate that an analog-to-digital converter will be located within either the analog front-end circuitry 204 or digital front-end circuitry 206 arranged to convert received analog signals to a digital form for ease of processing.

The digital front-end circuitry 206 outputs a digital representation of the received transmission 201 from the satellite, to digital circuitry, for example digitized baseband samples of the transmitted multi-carrier signal. The received signal should be equalized to compensate the group delay due to the antenna and analog front-end. The digital circuitry performs a number of functions in the digital domain, in order to evaluate the signal carrier phase.

A carrier tracking loop is provided to keep track of the phase of the single carrier frequency in the multi-carrier signal. In this example, the carrier tracking loop includes a correlate, integrate and dump circuit 208 arranged to receive the digital representation of the received transmission 201 and provide a multi-carrier representation output (ZP). The multi-carrier representation output (ZP) from the correlate, integrate and dump circuit 208 is input to a carrier discriminator circuit 220, which is arranged to identify the carrier frequency. The output from the carrier discriminator circuit 220 is input to a carrier loop filter 220 configured to remove any unwanted signals, e.g., aliases, and input a filtered signal to a carrier Numerically Controlled Oscillator, NCO, 224. The carrier NCO 224 outputs a digital oscillator signal that is input to a carrier wipeoff circuit 226. Any Doppler effect of the carrier frequency may then be removed by the carrier wipeoff circuit 226, with the multi-carrier signal being routed back to the output of the digital front-end circuitry 206 as part of a classical carrier loop. As the effect of Doppler is different from one carrier to another due to its frequency dependency, it is important to remove the Doppler prior to determining compensation.

In principle, the tracked carrier phase may be defined as:

$$\rho_{phase} = \rho_t - C_o \cdot c_t + C_o \cdot c_r + \rho_{tropo} - \rho_{iono} + MP_{carrier}[m] \qquad \text{Equation [5]}$$

Where:
$\rho_t$ is the true geometric range to the transmitter;
Co is the speed of light;
$c_t$ is the clock bias of the transmitter;
$c_r$ is the clock bias of the receiver;
$\rho_{iono}$ is the Ionospheric group delay;
$\rho_{trop}$ is the distance increase due to Ionosphere; and MPcarrier is the carrier phase error due to noise and multipath.

A code tracking loop is also provided to keep track of the phase of a specific code of the single carrier frequency. In this example, the code tracking loop is a delay lock loop configured to correlate the input signal with replicas of the code. The code tracking loop includes a correlate, integrate and dump circuit 208 arranged to provide, in this simplified example, a first code output (ZE) and a second code output (ZL). A multi-carrier representation output (ZP), in addition to the first code output (ZE) and the second code output (ZL) from the correlate, integrate and dump circuit 208 are each input to a code discriminator circuit 210 arranged to identify a specific code. The specific code that is output from the code discriminator circuit 210 is input to a code loop filter 212 configured to remove any unwanted signals, e.g., aliases, related to the code, and input a filtered signal to a code Numerically Controlled Oscillator, NCO, 214. The code NCO 214 outputs a digital oscillator signal that is input to a code and phase generator circuit 216. An output from the code and phase generator circuit 216 is routed back to the output of the correlate, integrate and dump circuit 208. In this manner, the output of such a code tracking loop results in a perfectly aligned replica of the specific code extracted from the multi-carrier signal.

In principle the tracked code phase may be defined as:

$$\rho_{code} = \rho_t - C_o \cdot c_t + C_o \cdot c_r + \rho_{tropo} + \rho_{iono} + MP_{code}[m] \qquad \text{Equation [6]}$$

where:
$\rho_t$ is the true geometric range to the transmitter;
Co is the speed of light;
$c_t$ is the clock bias of the transmitter;
$c_r$ is the clock bias of the receiver;
$\rho_{iono}$ is the Ionospheric group delay;
$\rho_{trop}$ is the distance increase due to Ionosphere; and
MPcode is the code phase error due to noise (include interference and jammer) and multipath.

In accordance with examples of the invention, a single frequency (tracking) receiver is configured to take benefit of the multi-carrier signal in order to estimate the TEC value, and thereafter compensate for Ionospheric group delay. In some examples of the invention, signal carriers of the multi-carrier signal may be transmitted simultaneously, in a similar manner to classical orthogonal frequency division multiplex (OFDM) communications. Alternatively, in some examples of the invention, signal carriers of the multi-carrier signal may be transmitted asynchronously, in a similar manner to a frequency hopping signal. In a frequency hopping signal example, the signal is time-filtered to feed the corresponding additional carrier signal correlators.

It is noted that a cycle slip may occur for a low elevation angle but the amplitudes of the generated ruptures vary strongly from case to case. It is possible to detect high amplitude cycle slips, but more difficult to detect low amplitude cycle slips that don't allow estimating correctly the ionosphere code delay, for example with regards to civil aviation requirements in terms of integrity, for critical phases of flight. Thus, examples of the invention propose to monitor cycle slips, for example using Doppler predictions of phase measurements as described in [Ouzeau, 2006]. In other examples, it is envisaged that alternative approaches to monitor cycle slips may be used.

In this example, a further output from the code and phase generator circuit 216 is input 218 to a circuit configured to perform processing of digital signals. In one example, the circuit may be an integrated circuit 231 that includes one or more components configured to perform processing of digital signals. In some examples, the processing of digital signals may be performed by a signal processor 230, for example in software. In other examples, the processing may be performed in hardware or firmware. Clearly, the various components within the wireless communication unit 200 can be realized in discrete or integrated component form, with an ultimate structure therefore being an application-specific or design selection. Hereafter, for ease of explanations, this example will be described in terms of a digital circuit, which a skilled person will recognize can be implemented in software, hardware or firmware.

The digital circuit receiving the output from the code and phase generator circuit 216 comprises a plurality (1-N) of parallel partial correlate, integrate and dump circuits 232. In some examples, a processor may be configured to perform a similar function as a plurality (1-N) of parallel partial correlate, integrate and dump circuits. The plurality (1-N) of parallel partial correlate, integrate and dump circuits 232 each focus on an individual one of the multi-carrier signals. At least a first punctual correlator correlates the filtered received signal containing only the carrier $\Delta f_i$, and a second punctual correlator correlates the filtered received signal containing only the carrier $\Delta f_j$. The punctual correlators produce respective cross-correlator function (CCF) punctual phases for their respective carrier of the multi-carrier signal. In other examples, a number less than the total number of carriers of the multi-carrier signal may be used to produce respective CCF punctual phases. The output CCF punctual phases 234, e.g., bi and bj of at least two correlators, are evaluated considering the two equations below:

$$\beta_i = \arg_{]-\pi,\pi[}Z_{Pi}, \; \beta_j = \arg_{]-\pi,\pi[}Z_{Pj} \qquad \text{Equation [7]}$$

Each correlated output of CCF punctual phases of the multi-carrier representation (ZPi) 234 may be input into a cycle slip detector circuit 236. The cycle slip detector circuit 236 may be applied across multiple carrier frequencies and across time for the evaluation of the TEC from the multi-carrier signal. In some examples, it is considered that there may be no cycle slips between two time consecutive phase evaluations of the same carrier. In addition, in some examples, it is also considered that there may be no cycle slip between two consecutive carrier phases, independent of the value of the TEC.

For each of the respective multi-carrier representation outputs (ZPi), the cycle slip detector circuit 236 provides a cycle slip correction of the respective CCF punctual phases 238 to a frequency (a) discriminator circuit 240, which is configured to perform a frequency discrimination ('$\alpha_{ij}$') estimation of the carrier signals of the multi-carrier signal.

In the first example of a wireless communication unit illustrated in FIG. 2, which employs a processor configured to perform an '$\alpha$' discriminator 240 function, the TEC is evaluated for each $\Delta f_i, \Delta f_j$ combinations. A mean value of the TEC is evaluated and is used. Here, a first approximation of the '$\alpha$' discriminator function may be defined as:

$$\alpha_{ij} = \frac{\Delta \varphi (\Delta f_i - \Delta f_j)}{\left( \dfrac{1}{f_{carrier} + \Delta f_i} - \dfrac{1}{f_{carrier} + \Delta f_j} \right)} \qquad \text{Equation [8]}$$

For a simplified architecture, and assuming that the carrier frequency separation of the multi-carrier signal is much less than the carrier center frequency, i.e., where: $\Delta f_i$ is the frequency shift between the carrier center frequency fcarrier and the carrier 'i' of the multi carrier signal, $\Delta f_j$ is the frequency shift between the carrier center frequency fcarrier and the carrier j of the multi carrier signal, and that $\Delta f_i \ll$ fcarrier and $\Delta f_j \ll$ fcarrier, it is possible to consider a first order Taylor series of the 'α' discriminator function αij. In this example, the non-linearity may be neglected. This leads to:

$$\alpha_{ij} = \frac{f_{carrier} \cdot \Delta\varphi(\Delta f_i - \Delta f_j)}{(\Delta f_i - \Delta f_j)} \qquad \text{Equation [9]}$$

Thus, equation [9] shows that the phase dispersion between frequencies in the multi-carrier signal is proportional to the a discriminator divided by the carrier frequency, where the 'α' discriminator function may be defined as:

$$\alpha = \frac{\sum \alpha_{ij}}{\frac{n_{carrier}(n_{carrier}-1)}{2}} \qquad \text{Equation [10]}$$

and where ncarrier is the number of signal carriers used to evaluate the TEC (and where ncarrier corresponds also to the number of extra correlators as will be described later). The TEC can thus be directly estimated from α:

$$TEC = \frac{\alpha}{\beta} \qquad \text{Equation [11]}$$

The αij discriminator estimation may be as defined in equation [12], and may be applied for each correlator combination.

$$\alpha_{ij} = f_o^2 \frac{(\beta_j - \beta_i)}{(\Delta f_j - \Delta f_i)} \qquad \text{Equation [12]}$$

If the number of additional partial correlators that is used in the digital circuitry is ncor, then the number of correlator combinations may be defined in equation [13] as:

$$\frac{n_{cor}(n_{cor}-1)}{2} \qquad \text{Equation [13]}$$

Thereafter, in performing an αij discriminator estimator operation and using the number of correlator combinations in equation [13], the a discriminator circuit 240 may be also configured to evaluate the number of CCF punctual phase by averaging the αij combinations, as defined in equation [14]:

$$\alpha = \frac{\sum \alpha_{ij}}{\frac{n_{cor}(n_{cor}-1)}{2}} \qquad \text{Equation [14]}$$

Thus, the TEC is evaluated for each $\Delta f_i, \Delta f_j$ combinations, and the mean value of the TEC is evaluated and output 242 from the a discriminator circuit 240. In order to limit the ionosphere scintillation impact, an open loop is proposed to evaluate α. It is proposed to use a very low bandwidth (e.g., 10 MHz) to smooth the effect of the ionosphere scintillation, noise and multipath. The update of the 'α' would then be provided, say, every 100 seconds. It is considered that the change of TEC is very slow and the update rate of 'α' is more than sufficient to consider the TEC change rate.

The output is then applied to a TEC loop filter 244 that smooths the effect of the ionosphere scintillation. The output from the TEC loop filter 244 is a TEC estimate 246, which can be directly estimated based on the determination of the average value of α, calculated from equation [14] and when applied to equation [11].

As the ionosphere is dispersive, it affects the phase and the code in the opposite direction (noting that, in contrast, the troposphere exhibits a non-dispersive effect on the phase and the code in the same direction).

Thereafter, the processor of the digital circuit is arranged to calculate a compensating phase dispersion value, as defined in equation [15], which illustrates a multi-carrier representation of equation [3]:

$$\Delta\varphi(\Delta f_i - \Delta f_j) = \frac{-2\pi \times 10^{16} \times 40.3}{c_0} \times \qquad \text{Equation [15]}$$

$$TEC \times \frac{1}{f_{carrier}} \left[ \frac{1}{1+\frac{\Delta f_i}{f_{carrier}}} - \frac{1}{1+\frac{\Delta f_j}{f_{carrier}}} \right]$$

The compensating phase dispersion value calculated in TEC Ionospheric group delay compensation circuit 254 may be defined as:

$$\rho_{Iono} = \frac{40.3 \cdot TEC}{f_{carrier}^2} [m] \qquad \text{Equation [16]}$$

where:
$\rho_{Iono}$=iono error contribution (m)
TEC=unit of electron per m2
fcarrier=Carrier Frequency (Hz)

For each satellite link, the code phase (sometimes referred to as a 'pseudo range') and carrier phase are compensated $-\rho_{Iono}$ for the code and $+\rho_{Iono}$ for the carrier. These calculated phase dispersion compensation values are then applied to summing circuit 250, in order to remove the phase dispersion from the output of carrier NCO 224, and applied to subtracting circuit 252, in order to remove the phase dispersion from the output of code NCO 214.

Example receiver architectures, such as the one described above, may be implemented in hardware, using integrated circuits. In other examples, as microcontrollers are becoming much faster, such digital circuits may be implemented in software. In the example satellite system the digital circuit is implemented in hardware, as the carrier loops need to lock onto signals in the MHz range, or faster.

This illustrated example shows an integrated circuit 231 that includes one or more processor(s) 230 to perform processing of digital signals, including the partial correlate, integrate and dump circuit 232, cycle slip detector circuit 236, frequency (a) discriminator circuit 240, TEC loop filter 244 and TEC Ionospheric group delay compensation circuit 254. However, in other examples, it is envisaged that the processor 230 and/or integrated circuit 231 may include further additional digital signal processing functions, such as code discriminator 210, carrier discriminator 220, etc. In other examples, the processing may be performed in hardware or firmware.

A controller (not shown) maintains overall operational control of the wireless communication unit 200. The controller is coupled to a number of the circuits, devices and, if included, any integrated circuits contained within the wireless communication unit 200. In some examples, the controller may also be coupled to the signal processor to pass control signals thereto. In some examples, the controller may also be coupled to a memory device (not shown) that selectively stores data, such as decoding/encoding functions, buffered data, and the like. A timer (not shown) is operably coupled to the controller to control the timing of operations (e.g., transmission or reception of time-dependent signals) within the wireless communication unit 200.

In some example wireless communication units a transmit chain (not shown) is also included, although such functionality will not be described in any detail in this description so as not to obfuscate the example invention details described herein.

Figure 3:
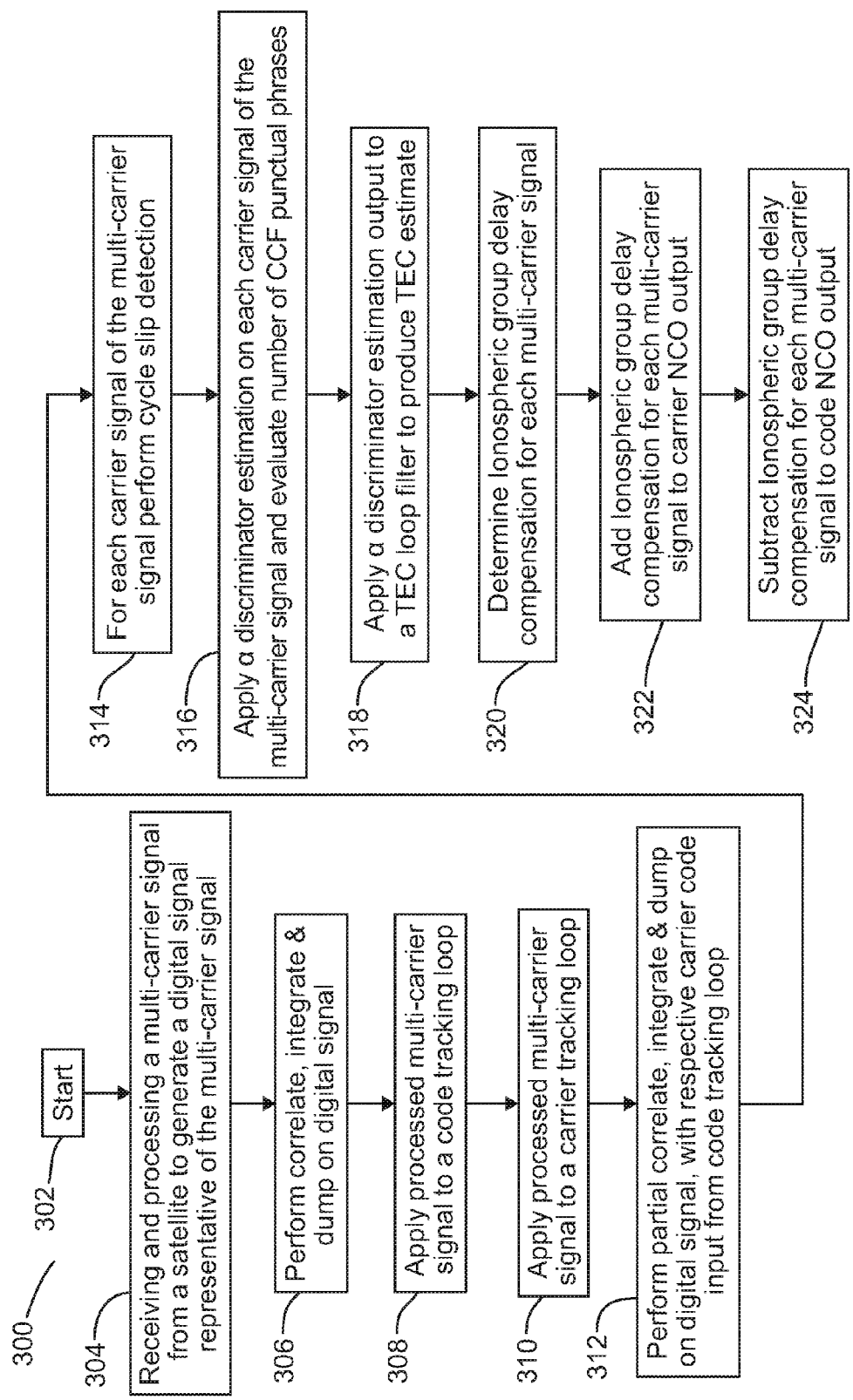
FIG. 3 illustrates a flowchart of the first example operation of the wireless communication unit of FIG. 2 in accordance with some example embodiments of the present invention.

FIG. 3 illustrates a flowchart 300 of the first example operation of the wireless communication unit of FIG. 2. The flowchart 300 starts at 302, and moves to 304 where the receiving communication unit receives and processes a multi-carrier signal routed via a satellite to generate a digital signal representative of the multi-carrier signal. At 306, the wireless communication unit performs a correlate, integrate & dump on the digital signal. At 308, the wireless communication unit applies the processed multi-carrier signal to a code tracking loop and carrier tracking loop at 310.

Notably, in accordance with embodiments of the invention, the wireless communication unit additionally performs a partial correlate, integrate & dump on the digital signal at 312, with respective code inputs from code tracking loop introduced to identify individual carriers from within the multi-carrier signal. At 314, for each carrier signal of the multi-carrier signal, the wireless communication unit performs cycle slip detection. At 316, the wireless communication unit applies frequency (a) discrimination estimation on each carrier signal of the multi-carrier signal and evaluates a number of CCF punctual phases. At 318, the wireless communication unit applies the a discriminator estimation output to a TEC loop filter to produce a TEC estimate. A processor then determines Ionospheric group delay compensation for each multi-carrier signal at 320. At 322, Ionospheric group delay compensation is added to each multi-carrier signal to carrier NCO output and at 324 Ionospheric group delay compensation for each multi-carrier signal is subtracted from the code NCO output.

FIG. 4 illustrates a second example of a wireless communication unit for communicating on the satellite communication system and adapted in accordance with some example embodiments of the present invention. Again, in this example, a single frequency tracking receiver is configured to take benefit of a received multi-carrier signal to estimate the TEC value. In large part, the second example of FIG. 4 comprises similar components and circuits as previously described with reference to the first example of FIG. 2. Thus, such similar components and circuits will not be described in further detail to avoid replication and obfuscation of other new components and circuits illustrated in FIG. 4.

Again, in FIG. 4, a digital circuit is included and configured to provide a TEC estimate output 446 based on the received multi-carrier signal. Notably, the digital circuit includes additional correlators that are used to evaluate the phase of at least two of the signal carriers of the multi-carrier signal. A compensating phase dispersion value can then be determined.

In this example, a further output from the code and phase generator circuit 216 is input 218 to a circuit configured to perform processing of digital signals. In one example, the circuit may be an integrated circuit 431 that includes one or more components configured to perform processing of digital signals. In some examples, the processing of digital signals may be performed by a signal processor 430, for example in software. In other examples, the processing may be performed in hardware or firmware. Clearly, the various components within the wireless communication unit 400 can be realized in discrete or integrated component form, with an ultimate structure therefore being an application-specific or design selection. Hereafter, for ease of explanations, this example will be described in terms of a digital circuit, which a skilled person will recognize can be implemented in software, hardware or firmware.

In this example, a further output from the code and phase generator circuit 216 is input 218 to a digital circuit comprising a plurality (1-N) of parallel partial correlate, integrate and dump circuits 232. In some examples, a processor may be configured to perform a similar function as a plurality (1-N) of parallel partial correlate, integrate and dump circuits. The plurality (1-N) of parallel partial correlate, integrate and dump circuits 232 each focus on an individual one of the multi-carrier signals. At least a first punctual correlator correlates the filtered received signal containing only the carrier $\Delta f_i$, and a second punctual correlator correlates the filtered received signal containing only the carrier $\Delta f_j$. The punctual correlators produce respective cross-correlator function (CCF) punctual phases for their respective carrier of the multi-carrier signal. In other examples, a number less than the total number of carriers of the multi-carrier signal may be used to produce respective CCF punctual phases. The output CCF punctual phases 234, e.g., bi and bj of at least two correlators, are evaluated considering equation [7].

Each correlated output of CCF punctual phases of the multi-carrier representation (ZPi) 234 may be input into a cycle slip detector circuit 236. When a cycle slip occurs, the corresponding phase measurement varies abnormally. The cycle slip detector circuit 236 may be applied across carrier frequencies and across time for the evaluation of the TEC from the received multi-carrier signal. In some examples, it is considered that there may be no cycle slips between two time consecutive phase evaluations of the same carrier. In addition, in some examples, it is also considered that there may be no cycle slip between two consecutive carrier phases, independent of the value of the TEC.

For each of the respective multi-carrier representation outputs (ZPi), the cycle slip detector circuit 236 provides a cycle slip correction of the respective CCF punctual phases 238 to a linear adaptive filter, such as Kalman filter 444.

A Kalman filter is used in the example in order to evaluate the Ionospheric code delay and to follow the evolution of ambiguities of all satellites that are in view. Each ambiguity value is not expected to vary along each corresponding satellite course from the receiver point of view. The acquisition and loss of each satellite may be taken into account in an estimation algorithm by updating the Kalman filter states according to the different satellites in view.

In the second receiver architecture of FIG. 4, the non-linearity of the ionosphere transfer function is taken into account. Thus, a first order Taylor series may be applied to show a relationship between phase jump and frequency offset. The first order Taylor series is a simplified version of equation [4] and can be used as potential simplified receiver architecture.

The principle is to minimize the TEC estimator errors with multi-carrier phases input using an appropriate algorithm. In this second example, the phase $\varphi_i$ corresponding to the carrier $\Delta f_i$ can also be evaluated using Equation [3]. At the instant k, the Kalman filter state can be expressed as:

$$X_k = \begin{pmatrix} TEC \\ \delta\varphi \end{pmatrix} \quad \text{Equation [17]}$$

The system model can be defined as a random walk model, as described by Equation [18] below:

$$X_{k+1} = \underbrace{\begin{bmatrix} 1 & 0 \\ 0 & 1 \end{bmatrix}}_{\Phi} X_k + \underbrace{\begin{pmatrix} n_{TEC} \\ n_{\delta\varphi} \end{pmatrix}}_{n} \quad \text{Equation [18]}$$

Alternatively, the system model can be defined as a Gauss Markov model, as described by equation [19] below:

$$X_{k+1} = \underbrace{\begin{bmatrix} e^{-\frac{T}{\tau_{TEC}}} & 0 \\ 0 & e^{-\frac{T}{\tau_{\delta\varphi}}} \end{bmatrix}}_{\Phi} X_k + \underbrace{\begin{pmatrix} n_{TEC} \\ n_{\delta\varphi} \end{pmatrix}}_{n} \quad \text{Equation [19]}$$

Where: T corresponds to the sample time equal to $t_k - t_{k-1}$, $\tau_{TEC}$ and $\tau_{\delta\varphi}$ corresponds to the correlation time of first order Gauss Markov process, and $n_{TEC}$ and $n_{\delta\varphi}$ drive the system noise n according to equation [20]:

$$\sigma_n^2 = \sigma_{GM}^2 \left(1 - e^{-\frac{2T}{\tau}}\right) \quad \text{Equation [20]}$$

where $\sigma_{GM}^2$ is the process variance.
Thus, Equation [3] can be rewritten as equation [21]:

$$\underbrace{\begin{pmatrix} \varphi_i \\ \vdots \\ \vdots \\ \vdots \\ \vdots \end{pmatrix}}_{Y} = \underbrace{\begin{bmatrix} \frac{A}{f_{carrier} + \Delta f} & 1 \\ \vdots & \vdots \\ \vdots & \vdots \\ \vdots & \vdots \\ \vdots & \vdots \end{bmatrix}}_{H} \underbrace{\begin{pmatrix} TEC \\ \delta\varphi \end{pmatrix}}_{X} + \underbrace{\begin{pmatrix} V_i \\ \vdots \\ \vdots \\ \vdots \end{pmatrix}}_{V} \quad \text{Equation [21]}$$

In general, the Kalman Filter 444 can be expressed by the following equations:

$$\underline{X}_{k+1} = \Phi \underline{X}_k \quad \text{Equation [22]}$$

$$\underline{P}_{k+1} = \Phi P_k \Phi^t + \underbrace{Q_k}_{\text{Covariance Matrix of } \underline{n}} \quad \text{Equation [23]}$$

$$K_k = P_k H_k^t \left(H_k P_k H_k^t + \underbrace{R_k}_{\text{Covariance of measurement } \underline{v}}\right)^{-1} \quad \text{Equation [24]}$$

$$X_k = X_k - K_k(H_k X_k - \underline{Y}_k) \quad \text{Equation [25]}$$

$$P_k = (I - K_k X_k) P_k \quad \text{Equation [26]}$$

Although the second architecture example illustrated in FIG. 4 proposes a use of a Kalman filter 444 to provide a TEC estimate, in other examples it is envisaged that, say, a processor configured to apply an adaptive linear filter algorithm, such as a least-square estimator, could also be used to minimize any residual of a slope estimate.

A significant benefit of using a multi-carrier signal for the TEC evaluation is that carrier slip can be detected easily by supposing that, between two consecutive carriers, no cycle slip can occur even if the TEC is very high.

One significant advantage of the proposed satellite system and the receiver architectures of FIG. 2 and FIG. 4 is that the transmitter side is much less complex, as the transmitter needs to transmit only one single carrier frequency supporting a multicarrier signal, with low frequency shift between two consecutive carriers of the multicarrier signal.

The receiver architectures also provide a gain in terms of energy spent. At a receiver side, the receiver is slightly more complex in terms of a number of partial correlators to be used. However, the receiver has only to receive one single carrier frequency signal instead of two carrier frequencies with the known dual-frequency classical method.

This illustrated example shows an integrated circuit 431 that includes one or more processor(s) 430 to perform processing of digital signals, including the partial correlate, integrate and dump circuit 432, cycle slip detector circuit 436, Kalman filter 444 and TEC Ionospheric group delay compensation circuit 454. However, in other examples, it is envisaged that the processor 430 and/or integrated circuit 431 may include further additional digital signal processing functions, such as code discriminator 210, carrier discriminator 220, etc. In other examples, the processing may be performed in hardware or firmware.

Figure 5:
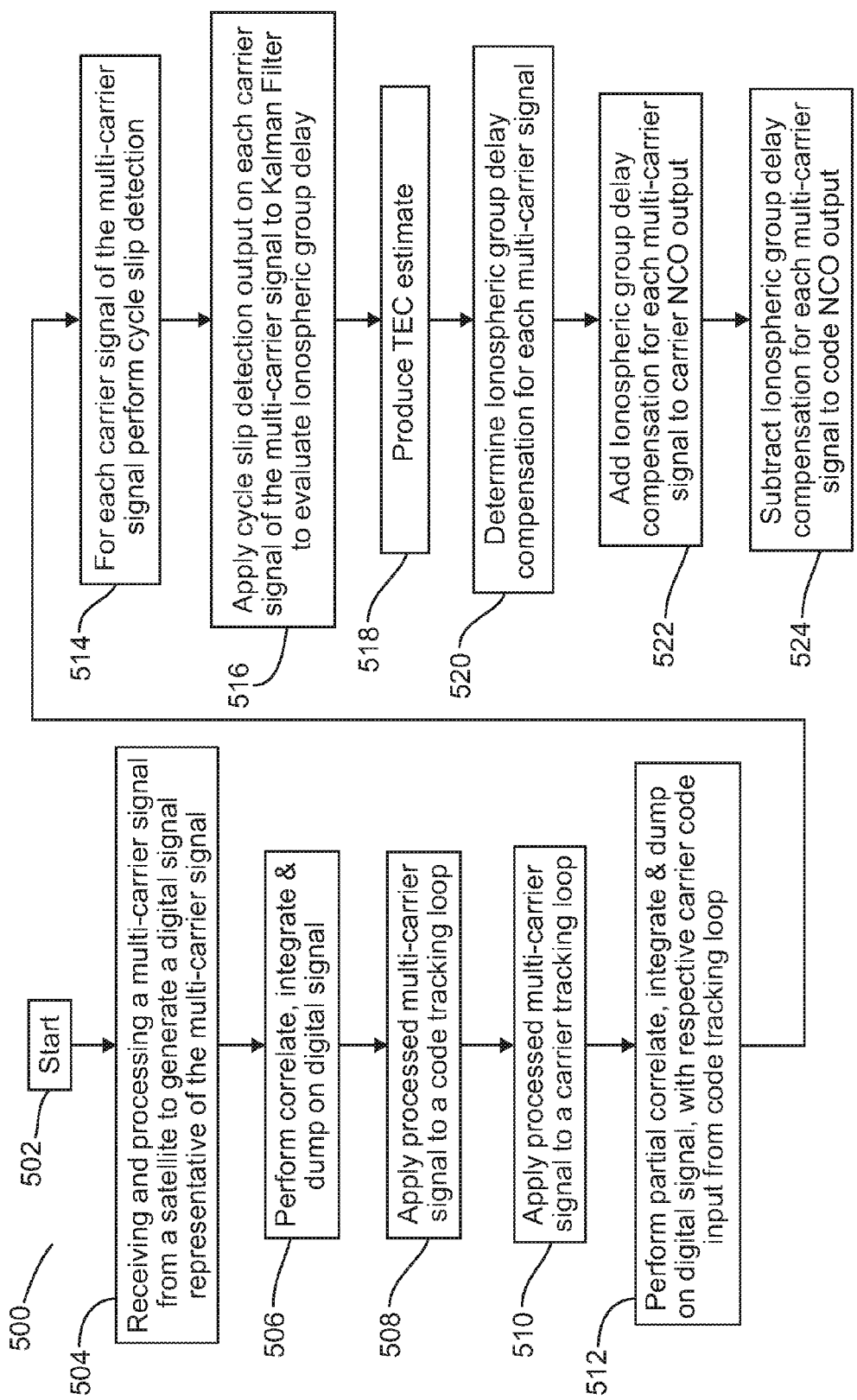
FIG. 5 illustrates a flowchart of the second example operation of the wireless communication unit of FIG. 4 in accordance with some example embodiments of the present invention.

FIG. 5 illustrates a flowchart of the second example operation of the wireless communication unit of FIG. 4. The flowchart 500 starts at 502, and moves to 504 where the receiving communication unit receives and processes a multi-carrier signal routed via a satellite to generate a digital signal representative of the multi-carrier signal. At 506, the wireless communication unit performs a correlate, integrate & dump on digital signal. At 508, the wireless communication unit applies the processed multi-carrier signal to a code tracking loop and applies the processed multi-carrier signal to a carrier tracking loop at 510.

Notably, in accordance with embodiments of the invention, the wireless communication unit additionally performs a partial correlate, integrate & dump on the digital signal at 512, with respective code inputs from code tracking loop to identify individual carriers from within the multi-carrier signal. At 514, for each carrier signal of the multi-carrier signal, the wireless communication unit performs cycle slip detection. At 516, the wireless communication unit applies cycle slip detection output on each carrier signal of the multi-carrier signal to a Kalman Filter to evaluate Ionospheric group delay. At 518, the wireless communication unit produces TEC estimate. Ionospheric group delay compensation for each multi-carrier signal is determined at 520. At 522, Ionospheric group delay compensation for each multi-carrier signal is added to carrier NCO output and, at 524, Ionospheric group delay compensation for each multi-carrier signal is subtracted from the code NCO output.

In order to show the accuracy of the example methods, a TEC evaluation has been performed using the second receiver architecture of FIG. 4. Thus, the example tracking receiver includes a Kalman filter, which is the most efficient approach to evaluate the TEC as it also considers non linearity of the ionosphere transfer function.

Figure 6:
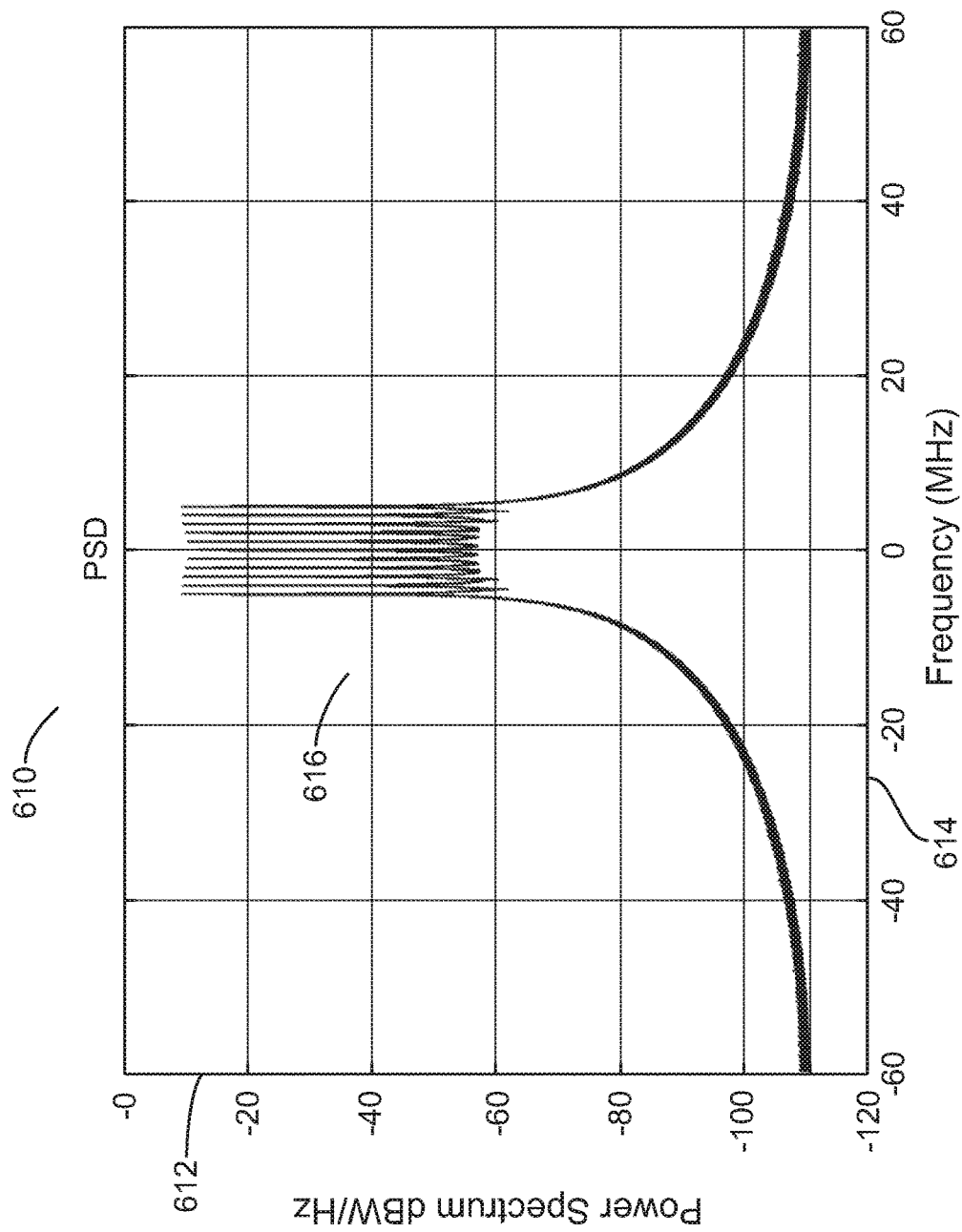
FIG. 6 illustrates a TEC estimation performance according to the first or second examples of a wireless communication unit.
Figure 6:
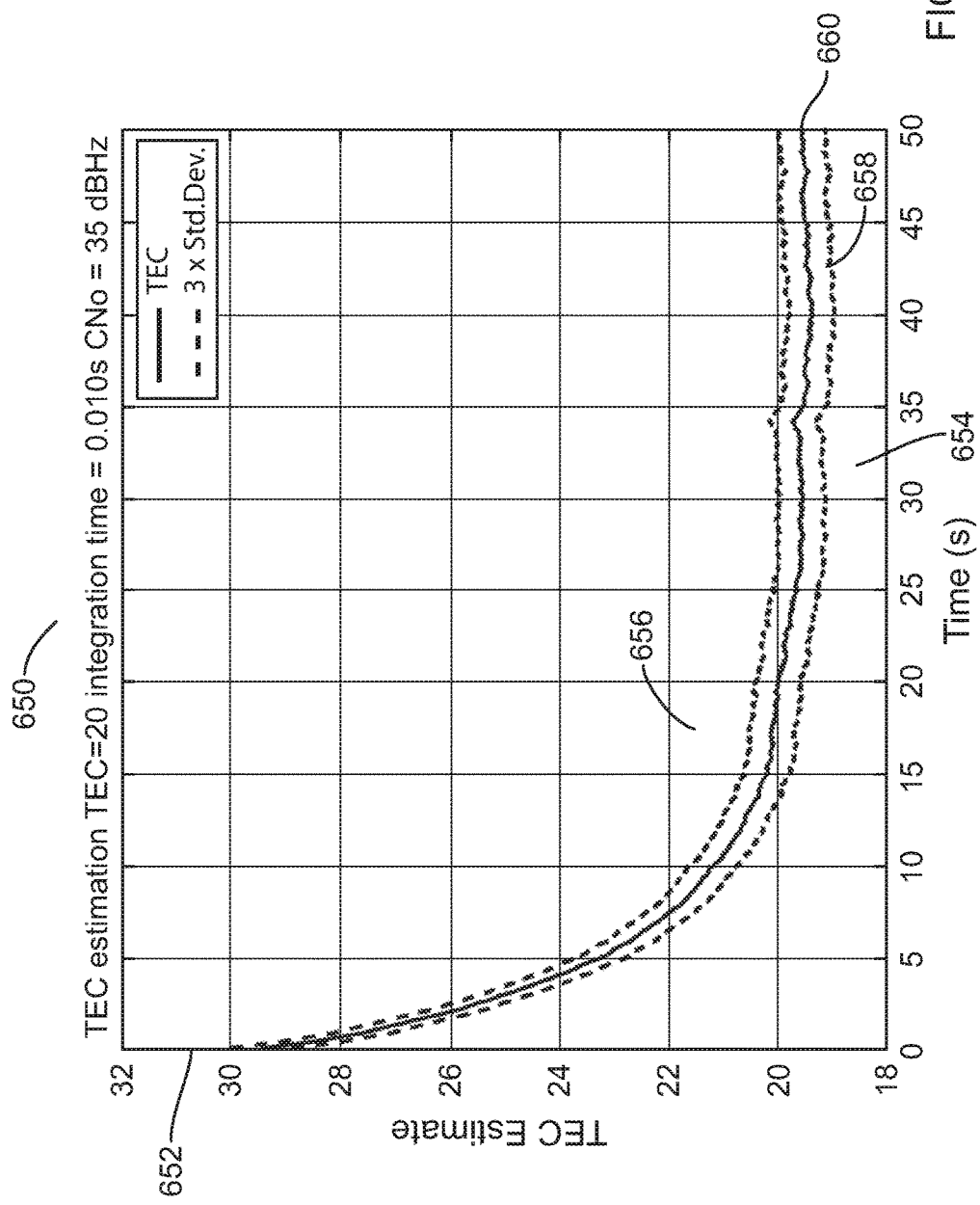

Thus, FIG. 6 illustrates a graph 610 of a multi-carrier signal 616 according to example embodiments of the present invention. Graph 610 shows power spectrum 612 versus frequency 614. For the simulation, and as illustrated in graph 610, the multi-carrier signal 616 includes 11 carriers ranging from −5*1.023 MHz to +5*1.023 MHz around the carrier center frequency.

FIG. 6 further illustrates a graph 650 of a simulation result 656 of a TEC estimation considering a noise environment (CNo=35 dBHz) and an integration time of 10 msec according to example embodiments of the present invention. The corresponding TEC evaluation is shown after a short period of convergence, and illustrates that the TEC evaluation is very accurate when using a Kalman filter.

The efficiency and accuracy on the TEC estimation helps to minimize the ionosphere range contribution. The evaluation of the TEC has to be performed for all transmitter links, as the TEC may change from one communication link to another. From equation [16], it is possible to derive the residual ionosphere range error contributions due to error on TEC, as illustrated in equation [27]:

$$e_{Iono} = \frac{40.3 \cdot \delta TEC}{f^2} [m] \quad \text{Equation [27]}$$

Figure 7:
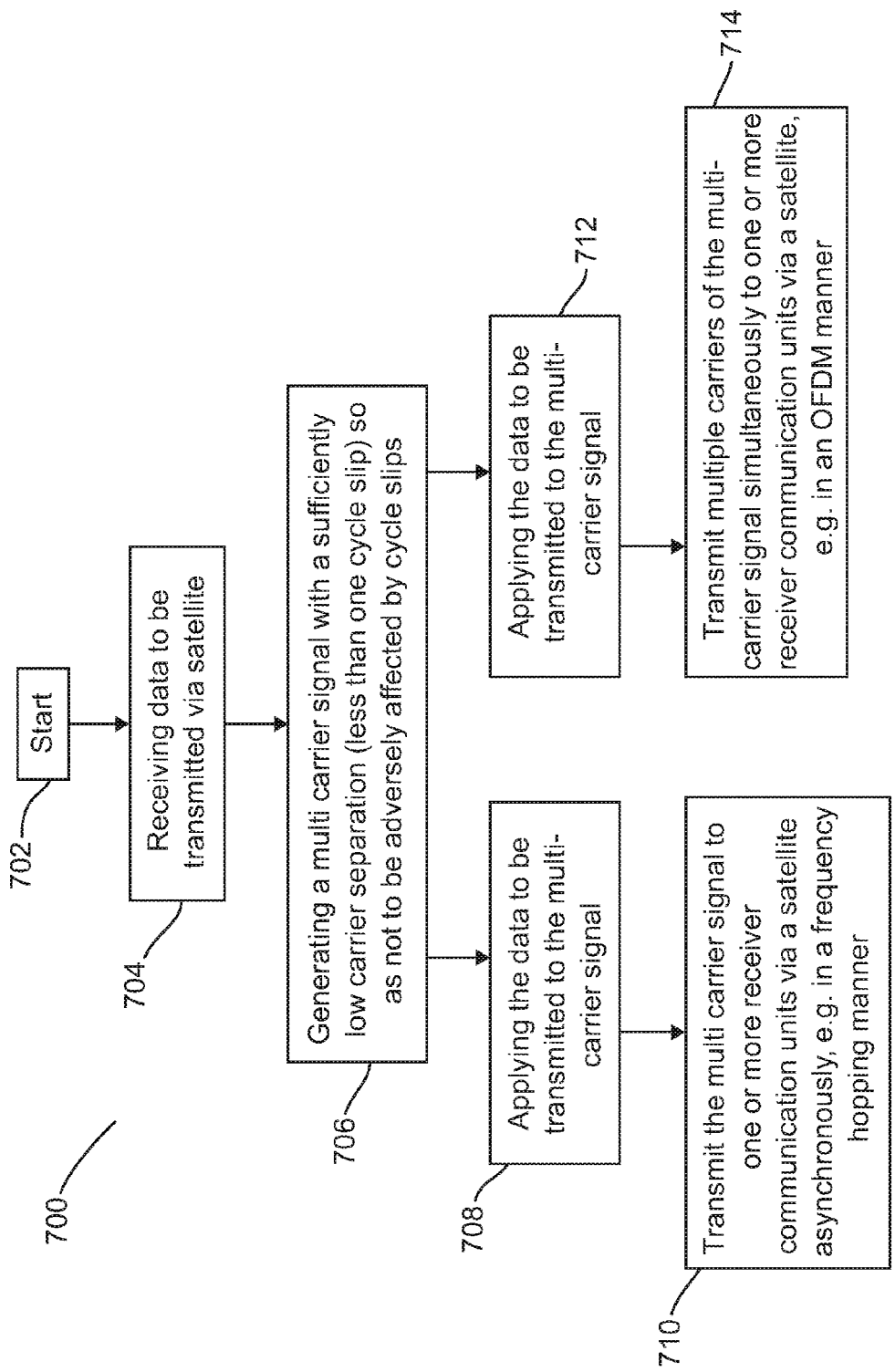
FIG. 7 illustrates a flowchart of an example operation of a wireless communication unit configured to transmit a signal via a satellite in accordance with some example embodiments of the present invention.

An error of 1 TECU would introduce an error of 0.0406 m for a frequency f=1575.42 MHz Referring now to FIG. 7, a flowchart 700 of an example operation of a wireless communication unit configured to transmit a multi-carrier signal on a single carrier frequency via a satellite is illustrated in accordance with some example embodiments of the present invention. As described above, a difference between code and carrier phase measurements may provide twice the Ionospheric group delay, plus phase ambiguity, residual noise and multipath. To be able to solve the phase ambiguity, the code error has to be lower than the cycle slips. Therefore, the flowchart 700 addresses this phase ambiguity problem from the transmit side.

The method starts at 702 and data to be transmitted is received at the wireless communication unit transmit processor at 704. A multi-carrier signal is then generated at 706. Notably, the multi-carrier signal generated at 706 is configured with a sufficiently low carrier separation so as not to be adversely affected by cycle slips.

In one example, the data to be transmitted may then be applied to the multi-carrier signal at 708 and the multi-carrier signal transmitted to one or more receiver communication units via a satellite asynchronously, at 710. In this manner, in one example, multi-carrier signals may be transmitted over a narrow bandwidth in, say, a frequency hopping manner.

In an alternative example, the data to be transmitted may then be applied to the multi-carrier signal at 712 such that multiple carriers of the multi-carrier signal may be transmitted simultaneously to one or more receiver communication units via a satellite at 710, for example in an OFDM manner.

As will be appreciated, the disclosed methods, integrated circuits and communication units described herein may be embodied in hardware as one or more circuits and/or processing stages. However, selected aspects of the functionality of the one or more processing stages may be programmed or loaded by processing circuitry (e.g., a field-programmable gate array) executing software (e.g., in a processor or a controller including but not limited to firmware, resident software, microcode, etc.). Any such programming operation may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk, USB memory stick, and an optical disk, such as a compact disk-read only memory (CD-ROM), compact disk-read/write (CD-R/W), DVD, and the like.

Figure 8:
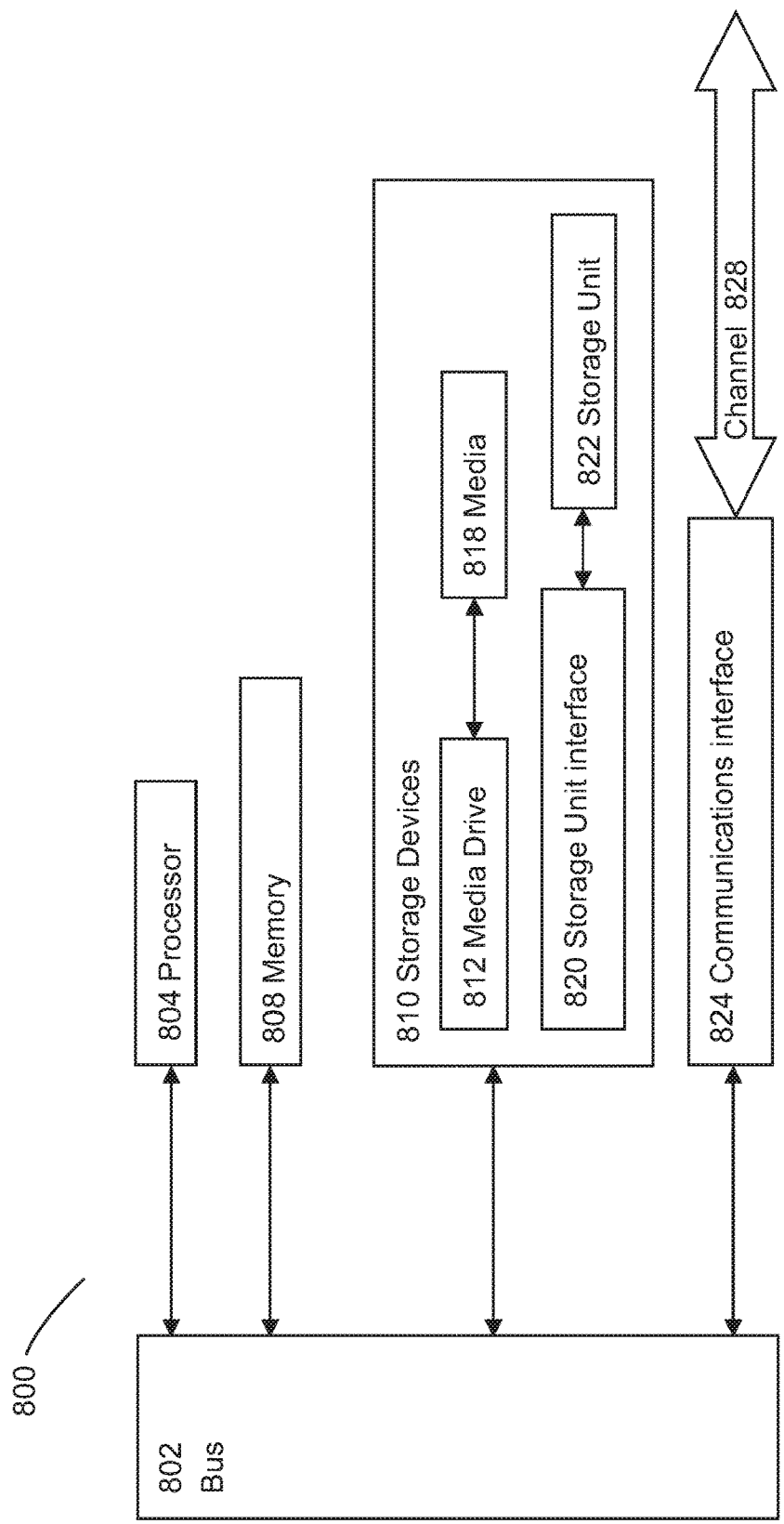
FIG. 8 illustrates a typical computing system that may be employed a wireless communication unit to perform an enforcement role in accordance with some example embodiments of the invention.

Referring now to FIG. 8, there is illustrated a typical computing system 800 that may be employed to implement receiving and processing a multi-carrier signal from a satellite such that a receiver may be able to compensate for Ionospheric group delay subjected on the signal, in accordance with some example embodiments of the invention. Alternatively, the computing system 800 may be employed to generate a multi-carrier signal to be routed via a satellite communication system and enable a receiver to compensate for Ionospheric group delay subjected on the signal, in accordance with some example embodiments of the invention. Computing systems of this type may be used in wireless communication units. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control logic. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and be implemented using a wireless medium, wire or cable, fiber optics, or other communications medium.

In this document, the terms 'computer program product', 'computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 822, drive 812 or communications interface 824. The control logic (in this example, software instructions or computer program code), when executed by the processor 804, causes the processor 804 to perform the functions of the invention as described herein.

In one example, a non-transitory tangible computer program product comprising executable code stored therein may be used for compensating for Ionospheric group delay in a satellite-based communication system. The code may be operable for, when executed at a receiving wireless communication unit, receiving a multi-carrier signal from a satellite; and processing the multi-carrier signal to produce a plurality of digital representations of individual carriers of the multi-carrier signal; estimating, from the plurality of digital representations of individual carriers of the multi-carrier signal, a Total Electron Content, TEC, value associated with a communication path between the satellite and the wireless communication unit through Earth's Ionosphere; and applying compensation for Ionospheric group delay subjected to the multi-carrier signal based on the determined TEC value.

In one example, a non-transitory tangible computer program product comprising executable code stored therein may be used generating a signal to be broadcast in a satellite communication system and enable a receiver to compensate for Ionospheric group delay subjected on the signal. The code may be operable for, when executed at a transmitting wireless communication unit, receiving data to be transmitted; generating a multi-carrier signal, where the carrier signal separation of carriers in the multi-carrier signal is equivalent to less than one cycle slip; applying the data to be transmitted to the multi-carrier signal; and transmitting the multi-carrier signal to one or more receiver communication units via a satellite.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. For example, the integrated circuit may be suitable for a wireless communication unit for receiving communications via a satellite in a satellite-based communication system. The integrated circuit comprises: a processor coupleable to a receiver and configured to: process the multi-carrier signal to produce a plurality of digital representations of individual carriers of the multi-carrier signal; estimate, from the plurality of digital representations of individual carriers of the multi-carrier signal, a Total Electron Content, TEC, value associated with a communication path between the satellite and the wireless communication unit through Earth's Ionosphere; and apply compensation for Ionospheric group delay subjected to the multi-carrier signal based on the determined TEC value.

In another example, the integrated circuit may be suitable for a wireless communication unit for transmitting communications via a satellite in a satellite-based communication system. Here, the integrated circuit generates a signal to be broadcast in a satellite communication system and enable a receiver to compensate for Ionospheric group delay subjected on the signal. The integrated circuit comprises a processor coupled to a transmitter and configured to: receive data to be transmitted; generate a multi-carrier signal, where the carrier signal separation of carriers in the multi-carrier signal is equivalent to less than one cycle slip; apply the data to be transmitted to the multi-carrier signal; and transmit the multi-carrier signal to one or more receiver communication units via a satellite.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wireless communication unit for compensating for Ionospheric group delay in a satellite communication system, the wireless communication unit comprising:
   a receiver configured to receive only one single carrier frequency signal supporting a multi-carrier signal from a satellite; and
   a processor coupled to the receiver and configured to:
      process the single carrier frequency signal to produce a plurality of digital representations of individual carriers of the multi-carrier signal, wherein the processor being configured to process the single carrier frequency signal to produce a plurality of digital representations of individual carriers of the multi-carrier signal comprises the processor being configured to perform a phase evaluation of the multi-carrier signal to determine phases of the plurality of carrier signals of the multi-carrier signal;
      detect a cycle slip for each of the plurality of the carrier signals of the multi-carrier signal and provide a cycle slip correction of the respective phases of the plurality of carrier signals of the multi-carrier signal;
      estimate, from the plurality of digital representations of individual carriers of the multi-carrier signal, a Total Electron Content, TEC, value associated with a communication path between the satellite and the wireless communication unit through Earth's Ionosphere;
      perform a frequency discriminator estimation of each of the cycle slip corrections of the respective phases and average a plurality of discriminator estimation combinations for the carrier signals to produce a TEC estimate value; and
      apply compensation for Ionospheric group delay subjected to the multi-carrier signal based on the estimated TEC value.

2. The wireless communication unit of claim 1, wherein the processor is further configured to calculate Ionospheric group delay subjected to the multi-carrier signal based on the estimated TEC value.

3. The wireless communication unit of claim 1, wherein the processor is configured to apply compensation for Ionospheric group delay to at least one from a group of: a code oscillator output coupled to the processor, a carrier oscillator output coupled to the processor.

4. The wireless communication unit of claim 1, wherein the processor is configured to estimate the TEC value for a plurality of carrier combination of the multi-carrier signal and perform an average of the TEC value across the plurality of carrier combinations to estimate the TEC value.

5. The wireless communication unit of claim 1, wherein the processor is configured to estimate the TEC value for each carrier combination of the multi-carrier signal during a signal tracking operation when the carriers of the multi-carrier signal transport traffic messages.

6. The wireless communication unit of claim 1, wherein the processor comprises an adaptive linear filter configured to identify carrier signals in the multi-carrier signal.

7. The wireless communication unit of claim 1, wherein the receiver is a single frequency tracking receiver configured to recover traffic messages from a plurality of carriers of the multi-carrier signal.

8. An integrated circuit for a wireless communication unit receiving signals a satellite in a satellite-based communication system, the integrated circuit comprising:
   a processor coupleable to a receiver and configured to:
      process a received single carrier frequency signal supporting a multi-carrier signal to produce a plurality of digital representations of individual carriers of the multi-carrier signal, wherein the processor being configured to process the single carrier frequency signal comprises the processor being configured to perform a phase evaluation of the multi-carrier signal to determine phases of the plurality of carrier signals of the multi-carrier signal;
      detect a cycle slip for each of the plurality of the carrier signals of the multi-carrier signal and provide a cycle slip correction of the respective phases of the plurality of carrier signals of the multi-carrier signal;

estimate, from the plurality of digital representations of individual carriers of the multi-carrier signal, a Total Electron Content, TEC, value associated with a communication path between the satellite and the wireless communication unit through Earth's Ionosphere;

perform a frequency discriminator estimation of each of the cycle slip corrections of the respective phases and average a plurality of discriminator estimation combinations for the carrier signals to produce a TEC estimate value, and apply compensation for Ionospheric group delay subjected to the multi-carrier signal based on the estimated TEC value.

9. A method for compensating for Ionospheric group delay in a satellite-based communication system, the method at a wireless communication unit comprising:

receiving a single carrier frequency signal supporting a multi-carrier signal from a satellite;

processing the single carrier frequency signal to produce a plurality of digital representations of individual carriers of the multi-carrier signal, wherein the processing of the single carrier frequency signal to produce a plurality of digital representations of individual carriers of the multi-carrier signal comprises performing a phase evaluation of the multi-carrier signal to determine phases of the plurality of carrier signals of the multi-carrier signal;

detecting a cycle slip for each of the plurality of the carrier signals of the multi-carrier signal and provide a cycle slip correction of the respective phases of the plurality of carrier signals of the multi-carrier signal;

estimating from the plurality of digital representations of individual carriers of the multi-carrier signal, a Total Electron Content, TEC, value associated with a communication path between the satellite and the wireless communication unit through Earth's Ionosphere;

performing a frequency discriminator estimation of each of the cycle slip corrections of the respective phases and average a plurality of discriminator estimation combinations for the carrier signals to produce a TEC estimate value; and applying compensation for Ionospheric group delay subjected to the multi-carrier signal based on the estimated TEC value.

10. A satellite communication system comprising:

a transmit wireless communication unit configured to generate a single carrier frequency signal to be broadcast in the satellite communication system and enable a receiver to compensate for Ionospheric group delay subjected on a multi-carrier signal supported by the single carrier frequency signal; and a receive wireless communication unit comprising:
a receiver configured to receive a single carrier frequency signal supporting a multi-carrier signal from a satellite; and a processor coupled to the receiver and configured to:
process the single carrier frequency signal to produce a plurality of digital representations of individual carriers of the multi-carrier signal, wherein the processor being configured to process the single carrier frequency signal to produce a plurality of digital representations of individual carriers of the multi-carrier signal comprises the processor being configured to perform a phase evaluation of the multi-carrier signal to determine phases of the plurality of carrier signals of the multi-carrier signal;

detect a cycle slip for each of the plurality of the carrier signals of the multi-carrier signal and provide a cycle slip correction of the respective phases of the plurality of carrier signals of the multi-carrier signal;

estimate, from the plurality of digital representations of individual carriers of the multi-carrier signal, a Total Electron Content, TEC, value associated with a communication path between the satellite and the wireless communication units through Earth's Ionosphere;

perform a frequency discriminator estimation of each of the cycle slip corrections of the respective phases and average a plurality of discriminator estimation combinations for the carrier signals to produce a TEC estimate value; and apply compensation for Ionospheric group delay subjected to the multi-carrier signal based on the estimated TEC value.

* * * * *